United States Patent
Sakhnini et al.

(10) Patent No.: US 11,889,522 B2
(45) Date of Patent: Jan. 30, 2024

(54) PARTIAL CONTROL RESOURCE SET HANDLING

(71) Applicant: QUALCOMM Incorporated, San Diego, CA (US)

(72) Inventors: Iyab Issam Sakhnini, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/444,146

(22) Filed: Jul. 30, 2021

(65) Prior Publication Data

US 2023/0034639 A1 Feb. 2, 2023

(51) Int. Cl.
*H04W 72/23* (2023.01)
*H04L 5/00* (2006.01)

(52) U.S. Cl.
CPC .......... *H04W 72/23* (2023.01); *H04L 5/0048* (2013.01)

(58) Field of Classification Search
CPC ... H04L 5/0053; H04L 5/0048; H04L 5/0094; H04L 1/1812; H04L 72/0416; H04L 5/0051; H04L 5/14; H04L 1/0025; H04W 72/23; H04W 72/04; H04W 72/1289; H04W 24/08; H04W 72/042; H04W 72/0413; H04W 72/2695; H04W 27/04; H04W 72/0466; H04W 5/0051; H04W 72/0493
USPC ........................................................ 370/329
See application file for complete search history.

(56) References Cited

U.S. PATENT DOCUMENTS

| | | | | |
|---|---|---|---|---|
| 10,051,618 | B2* | 8/2018 | Gho | H04L 1/203 |
| 11,026,199 | B2* | 6/2021 | Nam | H04L 5/0044 |
| 11,316,645 | B2* | 4/2022 | Si | H04L 5/0064 |
| 11,395,167 | B2* | 7/2022 | Si | H04W 24/08 |
| 11,516,061 | B2* | 11/2022 | Si | H04L 27/2666 |
| 11,564,235 | B2* | 1/2023 | Sakhnini | H04W 72/0453 |
| 2019/0327767 | A1* | 10/2019 | Islam | H04L 27/2666 |
| 2020/0137741 | A1* | 4/2020 | Zhou | H04L 5/0053 |
| 2021/0298090 | A1 | 9/2021 | Myung et al. | |
| 2021/0321411 | A1* | 10/2021 | Sakhnini | H04L 5/0048 |
| 2021/0321412 | A1* | 10/2021 | Sakhnini | H04W 72/23 |
| 2021/0329681 | A1* | 10/2021 | Sakhnini | H04L 5/0044 |
| 2022/0095342 | A1* | 3/2022 | Khoshnevisan | H04L 5/0094 |
| 2022/0124686 | A1* | 4/2022 | Lee | H04L 1/00 |

(Continued)

*Primary Examiner* — Man U Phan
(74) *Attorney, Agent, or Firm* — Kevin M. Donnelly; Harrity & Harrity, LLP

(57) ABSTRACT

Various aspects of the present disclosure generally relate to wireless communication. In some aspects, a user equipment (UE) may receive an indication of an initial downlink bandwidth for the UE. The UE may receive, via a master information block (MIB), configuration information for a control resource set (CORESET) associated with physical downlink control channel (PDCCH) monitoring for initial access, where the configuration information indicates a frequency domain resource allocation for the CORESET, and where the frequency domain resource allocation for the CORESET is at least partially outside of the initial downlink bandwidth. The UE may receive one or more PDCCH messages associated with the CORESET based at least in part on at least one of modifying a resource mapping of the CORESET or modifying the initial downlink bandwidth. Numerous other aspects are provided.

12 Claims, 12 Drawing Sheets

(56) References Cited

U.S. PATENT DOCUMENTS

| | | | |
|---|---|---|---|
| 2022/0159618 A1* | 5/2022 | Parkvall | H04W 48/12 |
| 2022/0159701 A1* | 5/2022 | Islam | H04L 5/0053 |
| 2022/0225296 A1* | 7/2022 | Sakhnini | H04W 48/12 |
| 2022/0304014 A1* | 9/2022 | Li | H04L 5/0092 |
| 2022/0369126 A1* | 11/2022 | Wu | H04L 1/1854 |
| 2023/0031276 A1* | 2/2023 | Kwak | H04W 72/1263 |
| 2023/0119810 A1* | 4/2023 | Kim | H04W 24/08 370/329 |
| 2023/0125672 A1* | 4/2023 | Grossmann | H04W 24/08 370/329 |

\* cited by examiner

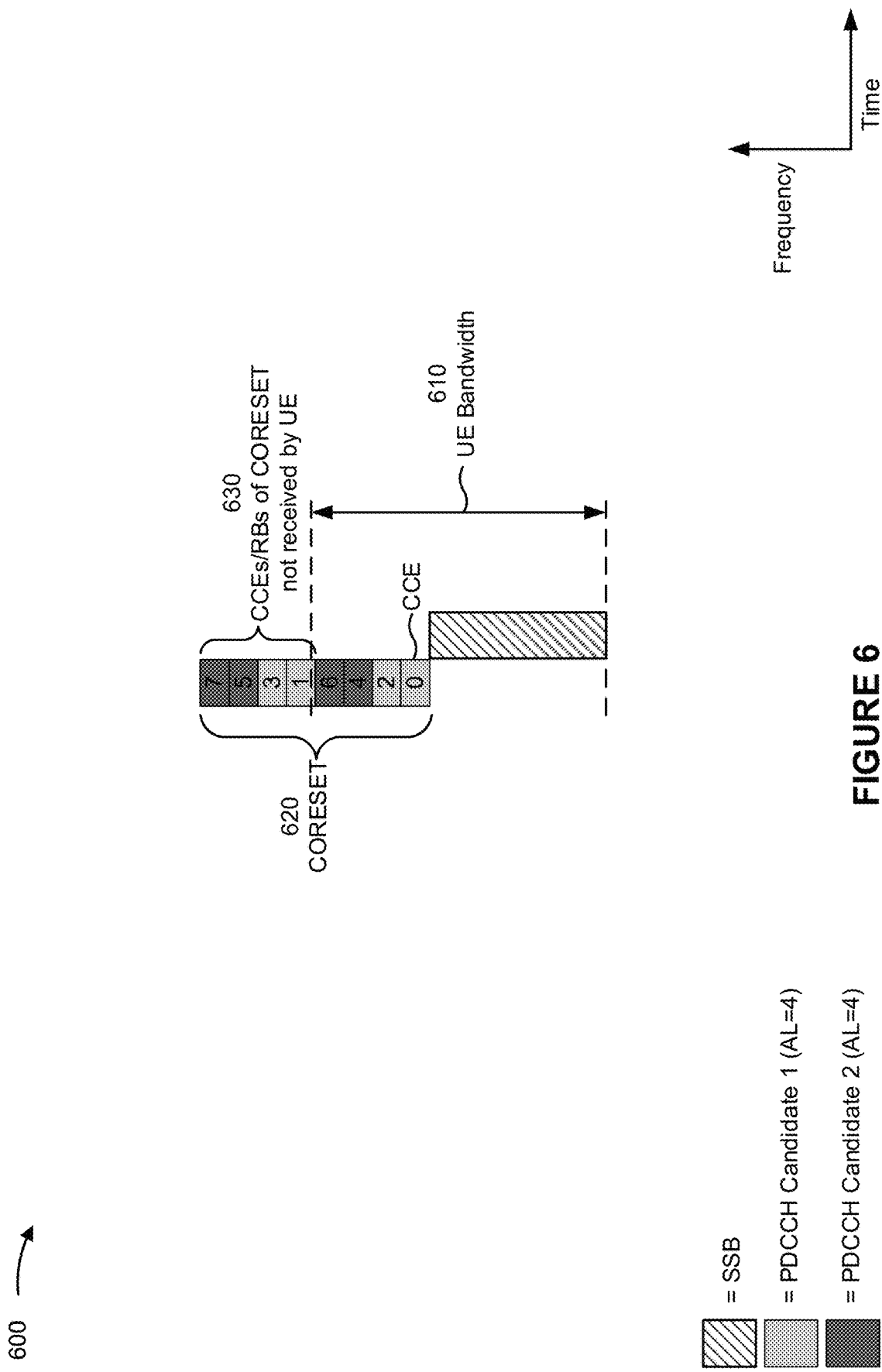

PARTIAL CONTROL RESOURCE SET HANDLING

FIELD OF THE DISCLOSURE

Aspects of the present disclosure generally relate to wireless communication and specifically, to techniques and apparatuses for partial control resource set (CORESET) handling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A potential control region of a slot may be referred to as a control resource set (CORESET) and may be structured to support an efficient use of resources, such as by flexible configuration or reconfiguration of resources of the CORESET for one or more physical downlink control channels (PDCCHs). In some cases, a CORESET may be associated with initial access for a wireless communication system, such as a CORESET 0. A configuration of the CORESET associated with initial access may be configured by broadcasted system information, such as via a master information block (MIB). In some cases, a user equipment (UE) may be associated with a downlink bandwidth for initial access with the wireless communication system (for example, an initial downlink bandwidth or an initial downlink bandwidth part (BWP)). The downlink bandwidth for initial access with the wireless communication system may be associated with a limited size for some UEs. For example, some UEs in a wireless network may be associated with a less advanced capability (such as a lower capability or a reduced capability) as compared to other UEs in the wireless network. The downlink bandwidth for initial access for the UEs with the less advanced capability may be smaller (in the frequency domain) than the downlink bandwidth for initial access for the UEs with a more advanced capability. However, as the configuration of the CORESET associated with initial access may be configured by broadcasted system information, the same CORESET may be configured for all UEs in the wireless network.

As a result, a portion of a frequency domain resource allocation (for example, one or more control channel elements (CCEs) or resource blocks (RBs)) of the CORESET may be configured outside of the downlink bandwidth for initial access for a UE. Because a portion of the frequency domain resource allocation (for example, one or more CCEs) of the CORESET may be outside of the downlink bandwidth for initial access, the UE may be unable to receive or decode some of the CCEs or RBs of the CORESET. Because the UE may be unable to receive a portion of the CORESET, a communication performance of the UE may be degraded. For example, an aggregation level of PDCCH candidates associated with the CORESET may be reduced. The reduced aggregation level may cause a degradation in the communication performance of the UE.

SUMMARY

Some aspects described herein relate to a user equipment (UE) for wireless communication. The UE may include at least one processor and at least one memory, communicatively coupled with the at least one processor, that stores processor-readable code. The processor-readable code, when executed by the at least one processor, may be configured to cause the UE to receive an indication of an initial downlink bandwidth for the UE. The processor-readable code, when executed by the at least one processor, may be configured to cause the UE to receive, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth. The processor-readable code, when executed by the at least one processor, may be configured to cause the UE to receive one or more PDCCH messages associated with the CORESET based at least in part on at least one of modifying a resource mapping of the CORESET or modifying the initial downlink bandwidth.

Some aspects described herein relate to a base station for wireless communication. The base station may include at least one processor and at least one memory, communicatively coupled with the at least one processor, that stores processor-readable code. The processor-readable code, when executed by the at least one processor, may be configured to cause the base station to transmit, to a UE, an indication of an initial downlink bandwidth for the UE. The processor-readable code, when executed by the at least one processor, may be configured to cause the base station to transmit, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The processor-readable code, when executed by the at least one processor, may be configured to cause the base station to transmit, to the UE, one or more PDCCH messages associated with the CORESET based at least in part on indicating an action to be performed by the UE when the frequency domain resource allocation for the CORESET is at least partially outside of the initial downlink bandwidth.

Some aspects described herein relate to a method of wireless communication performed by a UE. The method may include receiving an indication of an initial downlink bandwidth for the UE. The method may include receiving, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The method may include receiving one or more PDCCH messages associated with the CORESET based at least in part on at least one of modifying a resource mapping of the CORESET or modifying the initial downlink bandwidth.

Some aspects described herein relate to a method of wireless communication performed by a base station. The method may include transmitting, to a UE, an indication of an initial downlink bandwidth for the UE. The method may include transmitting, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The method may include transmitting, to the UE, one or more PDCCH messages associated with the CORESET based at least in part on indicating an action to be performed by the UE when the frequency domain resource allocation for the CORESET is at least partially outside of the initial downlink bandwidth.

Some aspects described herein relate to a non-transitory computer-readable medium that stores a set of instructions for wireless communication by a UE. The set of instructions, when executed by one or more processors of the UE, may cause the UE to receive an indication of an initial downlink bandwidth for the UE. The set of instructions, when executed by one or more processors of the UE, may cause the UE to receive, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The set of instructions, when executed by one or more processors of the UE, may cause the UE to receive one or more PDCCH messages associated with the CORESET based at least in part on at least one of modifying a resource mapping of the CORESET or modifying the initial downlink bandwidth.

Some aspects described herein relate to a non-transitory computer-readable medium that stores a set of instructions for wireless communication by a base station. The set of instructions, when executed by one or more processors of the base station, may cause the base station to transmit, to a UE, an indication of an initial downlink bandwidth for the UE. The set of instructions, when executed by one or more processors of the base station, may cause the base station to transmit, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The set of instructions, when executed by one or more processors of the base station, may cause the base station to transmit, to the UE, one or more PDCCH messages associated with the CORESET based at least in part on indicating an action to be performed by the UE when the frequency domain resource allocation for the CORESET is at least partially outside of the initial downlink bandwidth.

Some aspects described herein relate to an apparatus for wireless communication. The apparatus may include means for receiving an indication of an initial downlink bandwidth for the apparatus. The apparatus may include means for receiving, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The apparatus may include means for receiving one or more PDCCH messages associated with the CORESET based at least in part on at least one of modifying a resource mapping of the CORESET or modifying the initial downlink bandwidth.

Some aspects described herein relate to an apparatus for wireless communication. The apparatus may include means for transmitting, to a UE, an indication of an initial downlink bandwidth for the UE. The apparatus may include means for transmitting, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The apparatus may include means for transmitting, to the UE, one or more PDCCH messages associated with the CORESET based at least in part on indicating an action to be performed by the UE when the frequency domain resource allocation for the CORESET is at least partially outside of the initial downlink bandwidth.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 6 is a diagram illustrating an example of a partial CORESET, in accordance with the present disclosure.

DETAILED DESCRIPTION

Figure 1:
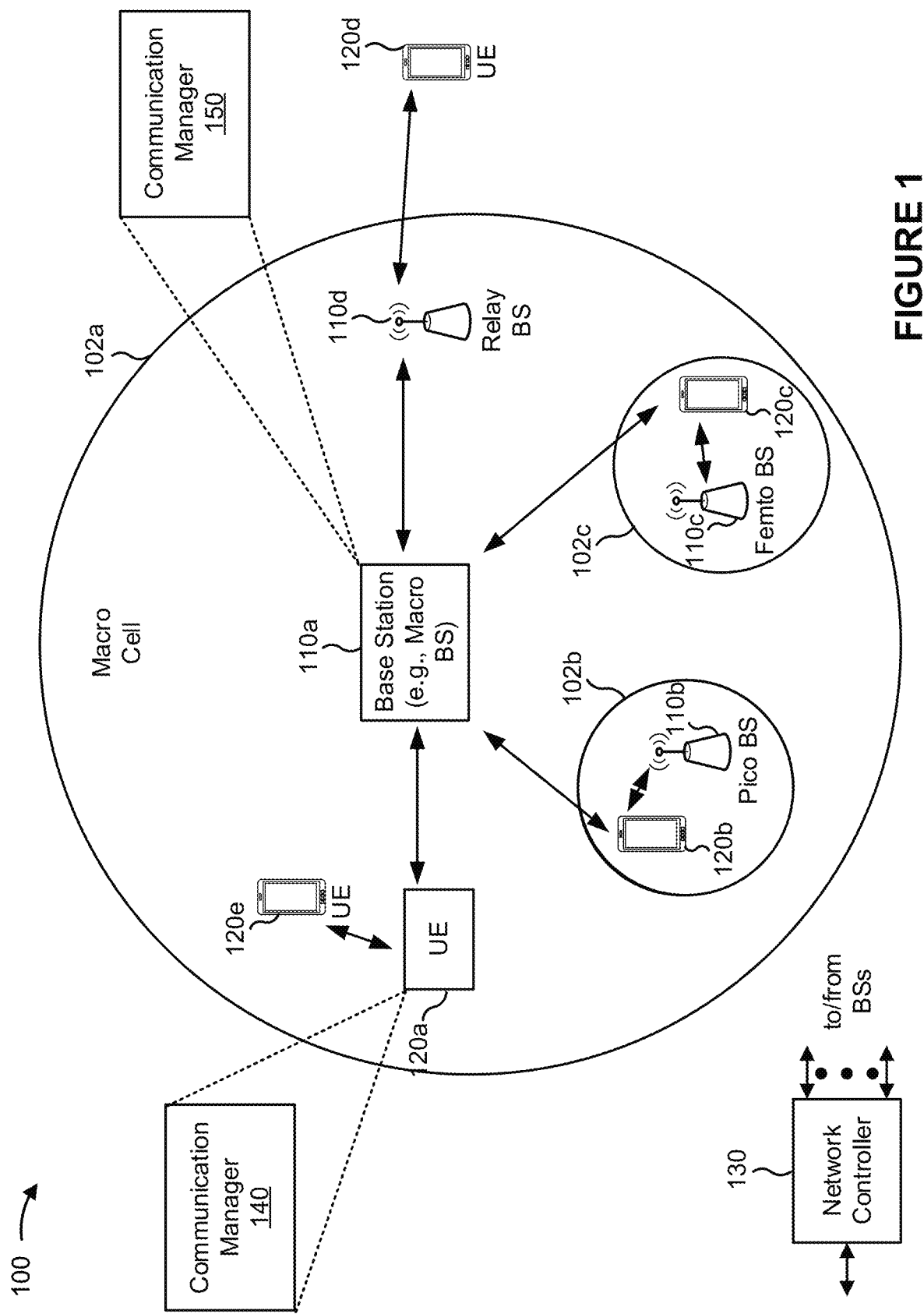
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to partial control resource set (CORESET) handling. "Partial CORESET" may refer to a CORESET, configured at a UE, that is associated with a frequency domain resource allocation that is at least partially outside of an initial downlink bandwidth (for example, an initial downlink bandwidth part (BWP) or a maximum downlink bandwidth for initial access purposes) of the UE. Some aspects more specifically relate to receiving, by a user equipment (UE), physical downlink control channel (PDCCH) messages associated with a partial CORESET based at least in part on modifying a resource mapping of the partial CORESET or modifying the initial downlink bandwidth of the UE. For example, in some aspects, the UE may modify a control channel element (CCE)-to-resource element group (REG) mapping using a quantity of available resource blocks (RBs) associated with the initial downlink bandwidth. In some aspects, the UE may modify a CCE-to-REG mapping type of the partial CORESET to a non-interleaving mapping type. In some other aspects, the UE may modify a frequency range associated with the initial downlink bandwidth to include the frequency domain resource allocation for the partial CORESET based at least in part on receiving a synchronization signal block (SSB) (for example, after receiving the SSB) associated with the partial CORESET.

In some aspects, the UE may receive the PDCCH messages associated with a partial CORESET based at least in part on identifying a starting RB of the partial CORESET (for example, when the starting RB is outside of the initial downlink bandwidth of the UE). The UE may identify the starting RB based at least in part on reducing a quantity of resource blocks associated with the frequency domain resource allocation for the CORESET based at least in part on a quantity of available resource blocks in the initial downlink bandwidth. In some aspects, the UE may identify the starting RB based at least in part on using common resource block index values associated with a carrier bandwidth (rather than RB index values associated with the initial downlink bandwidth) and an RB offset indicated by configuration information for the partial CORESET. In some other aspects, the UE may identify the starting RB based at least in part on virtually extending resource block indices associated with the initial downlink bandwidth (for example, by extending index value associated with the initial downlink bandwidth to negative values or values that exceed the configured index values for the initial downlink bandwidth).

In some aspects, the UE may receive an indication of an action to be performed by the UE when the frequency domain resource allocation for a CORESET is at least partially outside of the initial downlink bandwidth (for example, when the CORESET is a partial CORESET). The UE may receive the indication of the action to be performed via a CORESET zero configuration (for example, a controlResourceSetZero information element) included in a PDCCH configuration (for example, in apdcch-ConfigSIB1 information element) indicated by a master information block (MIB) that configures the CORESET, via the MIB that configures the CORESET, via a system information block (SIB), or via dedicated signaling, among other examples.

Particular aspects of the subject matter described in this disclosure can be implemented to realize one or more of the following potential advantages. In some examples, the described techniques can be used to maintain an aggregation level of PDCCH candidates of a CORESET when a frequency domain resource allocation for the CORESET is at least partially outside of an initial downlink bandwidth of a UE (for example, when the CORESET is a partial CORESET). Maintaining the aggregation level of the PDCCH candidate(s) may improve communication performance associated with receiving PDCCH messages associated with the CORESET. In some aspects, the described techniques can be used to maintain a quantity of PDCCH candidates associated with the CORESET. Maintaining the quantity of PDCCH candidates may improve a PDCCH capacity associated with receiving PDCCH messages associated with the CORESET. In some aspects, the described techniques can be used to remove ambiguity associated with a starting frequency domain resource (for example, a starting RB) of a CORESET when the starting RB is outside of the initial downlink bandwidth of the UE. This may enable the UE to map resources (for example, RBs or CCEs) to the CORESET, monitor the CORESET (and associated search space(s)), and receive one or more PDCCH messages associated with the CORESET.

FIG. 1 is a diagram illustrating an example of a wireless network in accordance with the present disclosure. The wireless network 100 may be or may include elements of a 5G (for example, New Radio (NR)) network or a 4G (for example, Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive an indication of an initial downlink bandwidth for the UE; receive, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth; and receive one or more PDCCH messages associated with the CORESET based at least in part on at least one of modifying a resource mapping of the CORESET or modifying the initial downlink bandwidth. Additionally or alternatively, the communication manager 140 may perform one or more other operations described herein.

In some aspects, the base station 110 may include a communication manager 150. As described in more detail elsewhere herein, the communication manager 150 may transmit, to a UE 120, an indication of an initial downlink bandwidth for the UE; transmit, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth; and transmit, to the UE, one or more PDCCH messages associated with the CORESET based at least in part on indicating an action to be performed by the UE when the frequency domain resource allocation for the CORESET is at least partially outside of the initial downlink bandwidth. Additionally or alternatively, the communication manager 150 may perform one or more other operations described herein.

Figure 2:
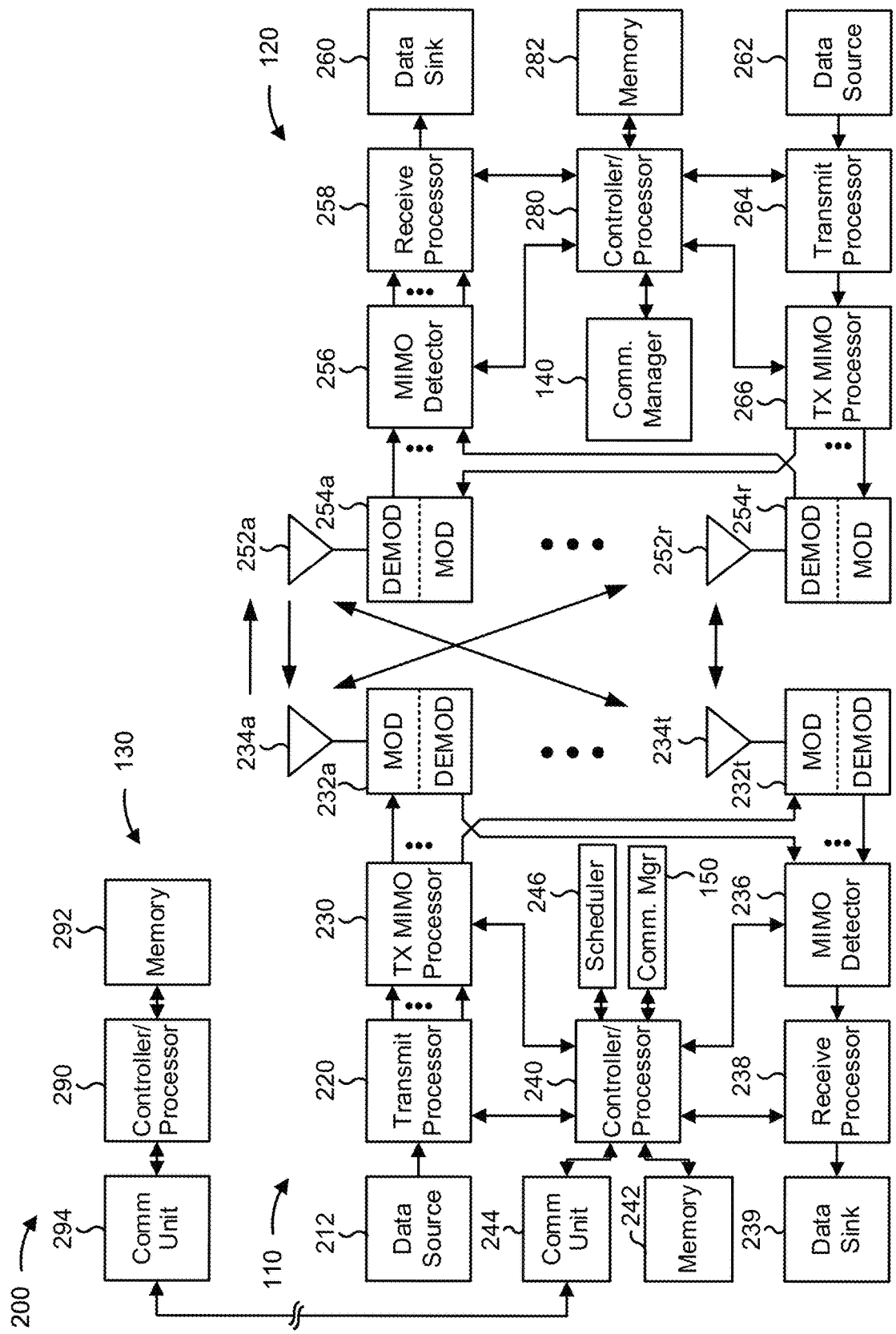
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with partial CORESET handling, as described in more detail elsewhere herein. For example, the controller/processor 240 of the base station 110, the controller/processor 280 of the UE 120, or any other component(s) of FIG. 2 may perform or direct operations of, for example, process 800 of FIG. 8, process 900 of FIG. 9, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 800 of FIG. 8, process 900 of FIG. 9, or other processes as described herein. In some examples, executing instructions may include running the instructions, converting the instructions, compiling the instructions, or interpreting the instructions, among other examples.

In some aspects, the UE 120 includes means for receiving an indication of an initial downlink bandwidth for the UE; means for receiving, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth; or means for receiving one or more PDCCH messages associated with the CORESET based at least in part on at least one of modifying a resource mapping of the CORESET or modifying the initial downlink bandwidth. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE 120, an indication of an initial downlink bandwidth for the UE; means for transmitting, to the UE 120 via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth; or means for transmitting, to the UE, one or more PDCCH messages associated with the CORESET based at least in part on indicating an action to be performed by the UE when the frequency domain resource allocation for the CORESET is at least partially outside of the initial downlink bandwidth. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Figure 3:
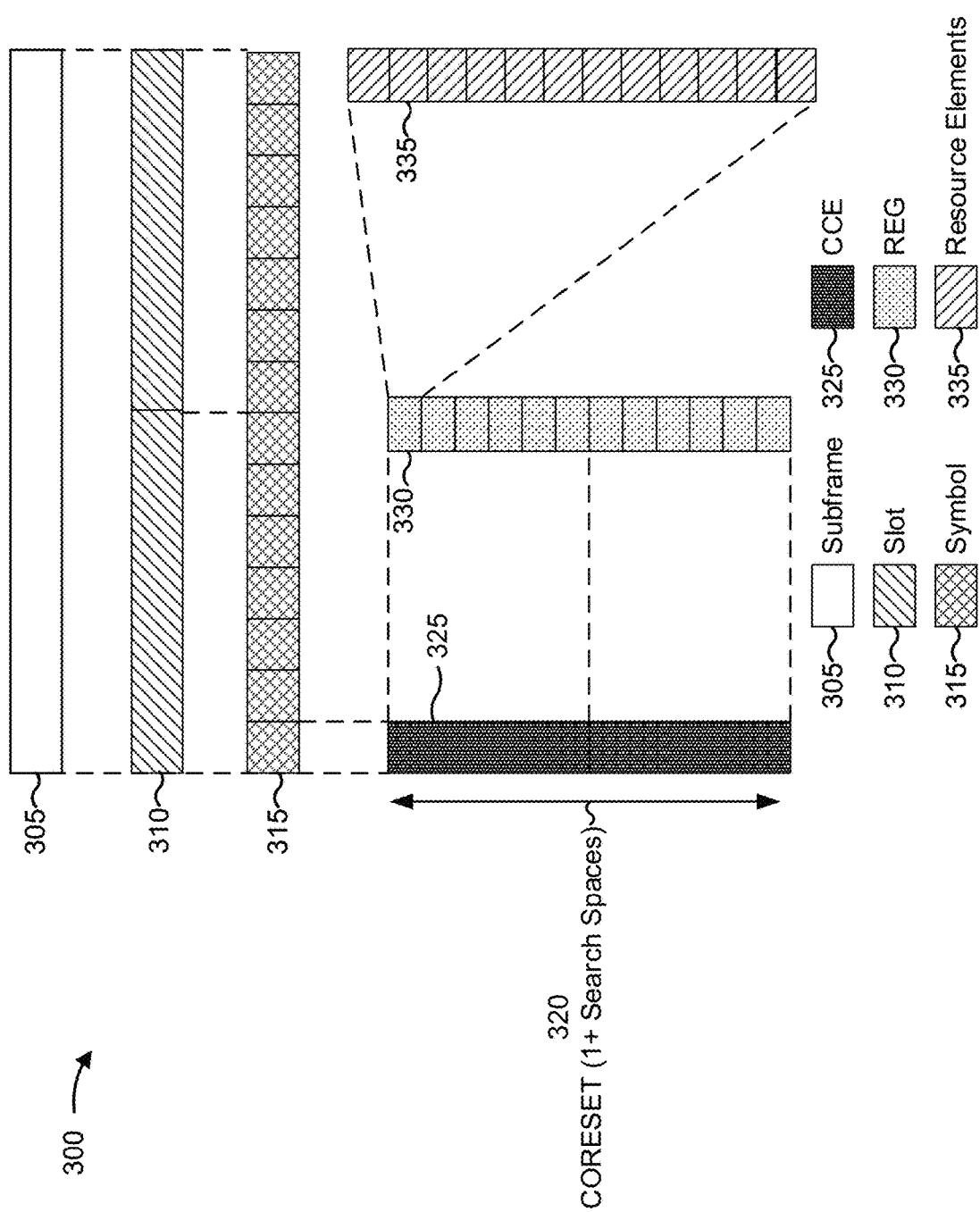
FIG. 3 is a diagram illustrating an example resource structure for wireless communication, in accordance with the present disclosure.

FIG. 3 is a diagram illustrating an example resource structure 300 for wireless communication, in accordance with the present disclosure. Resource structure 300 shows an example of various groups of resources described herein. As shown, resource structure 300 may include a subframe 305. Subframe 305 may include multiple slots 310. While resource structure 300 is shown as including 2 slots per subframe, a different quantity of slots may be included in a subframe (for example, 4 slots, 8 slots, 16 slots, 32 slots, or another quantity of slots). In some examples, different types of transmission time intervals (TTIs) may be used, other than subframes or slots. A slot 310 may include multiple symbols 315, such as 14 symbols per slot.

The potential control region of a slot 310 may be referred to as a CORESET 320 and may be structured to support an efficient use of resources, such as by flexible configuration or reconfiguration of resources of the CORESET 320 for one or more PDCCHs or one or more physical downlink shared channels (PDSCHs). In some examples, the CORESET 320 may occupy the first symbol 315 of a slot 310, the first two symbols 315 of a slot 310, or the first three symbols 315 of a slot 310. Thus, a CORESET 320 may include multiple resource blocks (RBs) in the frequency domain, and either one, two, or three symbols 315 in the time domain. In 5G, a quantity of resources included in the CORESET 320 may be flexibly configured, such as by using radio resource control (RRC) signaling to indicate a frequency domain region (for example, a quantity of resource blocks) or a time domain region (for example, a quantity of symbols) for the CORESET 320.

As illustrated, a symbol 315 that includes CORESET 320 may include one or more control channel elements (CCEs) 325, shown as two CCEs 325 as an example, that span a portion of the system bandwidth. A CCE 325 may include downlink control information (DCI) that is used to provide control information for wireless communication. A base station may transmit DCI during multiple CCEs 325 (as shown), where the quantity of CCEs 325 used for transmission of DCI represents the aggregation level (AL) used by the base station for the transmission of DCI. In FIG. 3, an aggregation level of two is shown as an example, corresponding to two CCEs 325 in a slot 310. In some aspects, different aggregation levels may be used, such as 1, 2, 4, 8, 16, or another aggregation level.

Each CCE 325 may include a fixed quantity of resource element groups (REGs) 330, shown as 6 REGs 330, or may include a variable quantity of REGs 330. In some examples, the quantity of REGs 330 included in a CCE 325 may be specified by a REG bundle size. A REG 330 may include one resource block (RB), which may include 12 resource elements (REs) 335 within a symbol 315 (for example, an REG may include 1 RB in the frequency domain and 1 symbol in the time domain). A resource element 335 may occupy one subcarrier in the frequency domain and one OFDM symbol in the time domain.

A search space may include all possible locations (for example, in time or frequency) where a PDCCH may be located. A CORESET 320 may include one or more search spaces, such as a UE-specific search space, a group-common search space, or a common search space. A search space may indicate a set of CCE locations where a UE may find PDCCHs that can potentially be used to transmit control information to the UE. The possible locations for a PDCCH may depend on whether the PDCCH is a UE-specific PDCCH (for example, for a single UE) or a group-common PDCCH (for example, for multiple UEs) or an aggregation level being used. A possible location (for example, in time or frequency) for a PDCCH may be referred to as a PDCCH candidate, and the set of all possible PDCCH locations (or PDCCH candidates) at an aggregation level may be referred to as a search space. For example, the set of all possible PDCCH locations (or all possible PDCCH candidates) for a particular UE may be referred to as a UE-specific search space. Similarly, the set of all possible PDCCH locations (or all possible PDCCH candidates) across all UEs may be referred to as a common search space. The set of all possible PDCCH locations (or all possible PDCCH candidates) for a particular group of UEs may be referred to as a group-common search space. One or more search spaces across aggregation levels may be referred to as a search space (SS) set.

A CORESET 320 may be interleaved or non-interleaved. An interleaved CORESET 320 may have CCE-to-REG mapping such that adjacent CCEs are mapped to scattered REG bundles in the frequency domain (for example, adjacent CCEs are not mapped to consecutive REG bundles of the CORESET 320). A non-interleaved CORESET 320 may have a CCE-to-REG mapping such that all CCEs are mapped to consecutive REG bundles (for example, in the frequency domain) of the CORESET 320.

Increases in carrier frequencies may enable the use of larger antenna arrays and bandwidths by UEs. Additionally, interest in millimeter wave frequency regimes is increasing, as these bandwidths can accommodate larger channel bandwidths than non-millimeter wave bandwidths. Bandwidth parts (BWPs), which are subsets of contiguous common physical resource blocks, may be used to configure active frequencies based on a UE's needs and capabilities. As used herein, "bandwidth part" or "BWP" may refer to a contiguous set of physical resource blocks (PRBs), where each PRB includes a set of frequencies corresponding to one or more subcarriers. A "subcarrier" may refer to a frequency based at least in part on a "carrier" frequency, and subcarriers may be aggregated to convey information wirelessly (for example, using OFDM symbols or other radio frequency symbols). Within a component carrier (CC), different BWPs may be supported on a band. In a typical case, a UE is expected to receive and transmit only within the frequency range configured for an active BWP (for example, rather than the entire frequency range of the band). CORESETs 320 or SS sets may be configured for a BWP. For example, a CORESET 320 may be configured for one or more BWPs configured for a UE.

In some cases, multiple BWPs may be configured for a UE, such as an initial BWP, one or more dedicated BWPs, or a dormant BWP, among other examples. The initial BWP (for example, an initial downlink BWP) may be used for initial access purposes (for example, to be used to access a channel prior to receiving a radio resource control (RRC) configuration). A BWP, from among multiple configured BWPs, actively utilized by the UE may be referred to as an active BWP. In some cases, the initial BWP may be a default BWP, which the UE may utilize when, for example, an inactivity timer expires.

In some cases, an initial CORESET may be configured for initial access purposes (for example, associated with an initial BWP). For example, an initial CORESET may be a CORESET associated with PDCCH monitoring for initial access. In some cases, an initial CORESET may be associated with monitoring for or receiving a system information block 1 (SIB1) (as defined, or otherwise fixed, by a wireless communication standard). The initial CORESET may be a Type0-PDCCH CORESET (for example, as defined, or otherwise fixed, by a wireless communication standard, such as the 3GPP) and may be referred to as a "CORESET 0" or a "CORESET zero." For example, the initial CORESET may be configured for a cell prior to a UE receiving any RRC configuration. In some cases, the initial CORESET may be configured via a master information block (MIB) (for example, via a PDCCH-ConfigSIB1 information element, a controlResourceSetZero information element, or a searchSpaceZero information element in the MIB, as defined, or otherwise fixed, by a wireless communication standard, such as the 3GPP). An MIB may be broadcast periodically by a base station. The MIB may indicate parameters (such as a system frame number, a subcarrier spacing (SCS) for a system information block (SIB), a PDCCH configuration for the SIB, among other examples) to enable UEs in the network to receive the SIB for initial access for a cell supported by the base station. The SIB may be a SIB1, which refers to a SIB that carries information relevant when evaluating if a UE is allowed to access a cell, defines the scheduling of other system information, or provides RRC information that is common for all UEs in the cell, among other examples. The MIB and SIB1 may be referred to as minimum system information (MSI). In some cases, SIB1 may be referred to as remaining minimum system information (RMSI).

In some cases, a frequency domain resource allocation for an initial CORESET (a CORESET 0) may be defined with reference to a synchronization signal block (SSB) (for example, with reference to a lowest frequency of the SSB). For example, some CORESETs may be defined with reference to a common reference point for resource block grids, which may be referred to as a "Point A," an "absolute frequency point A," or a "common RB (CRB) 0." However, the common reference point may be indicated to the UE via RRC signaling. Therefore, for a configuration of the initial CORESET, the UE may be, in some cases, only aware of (or receive) an SSB transmitted by a base station and the MIB transmitted by the base station. Therefore, a frequency domain resource allocation for an initial CORESET (a CORESET 0) may be defined with reference to an associated SSB (for example, that may be multiplexed with the initial CORESET, as explained in more detail elsewhere herein).

Figure 4:
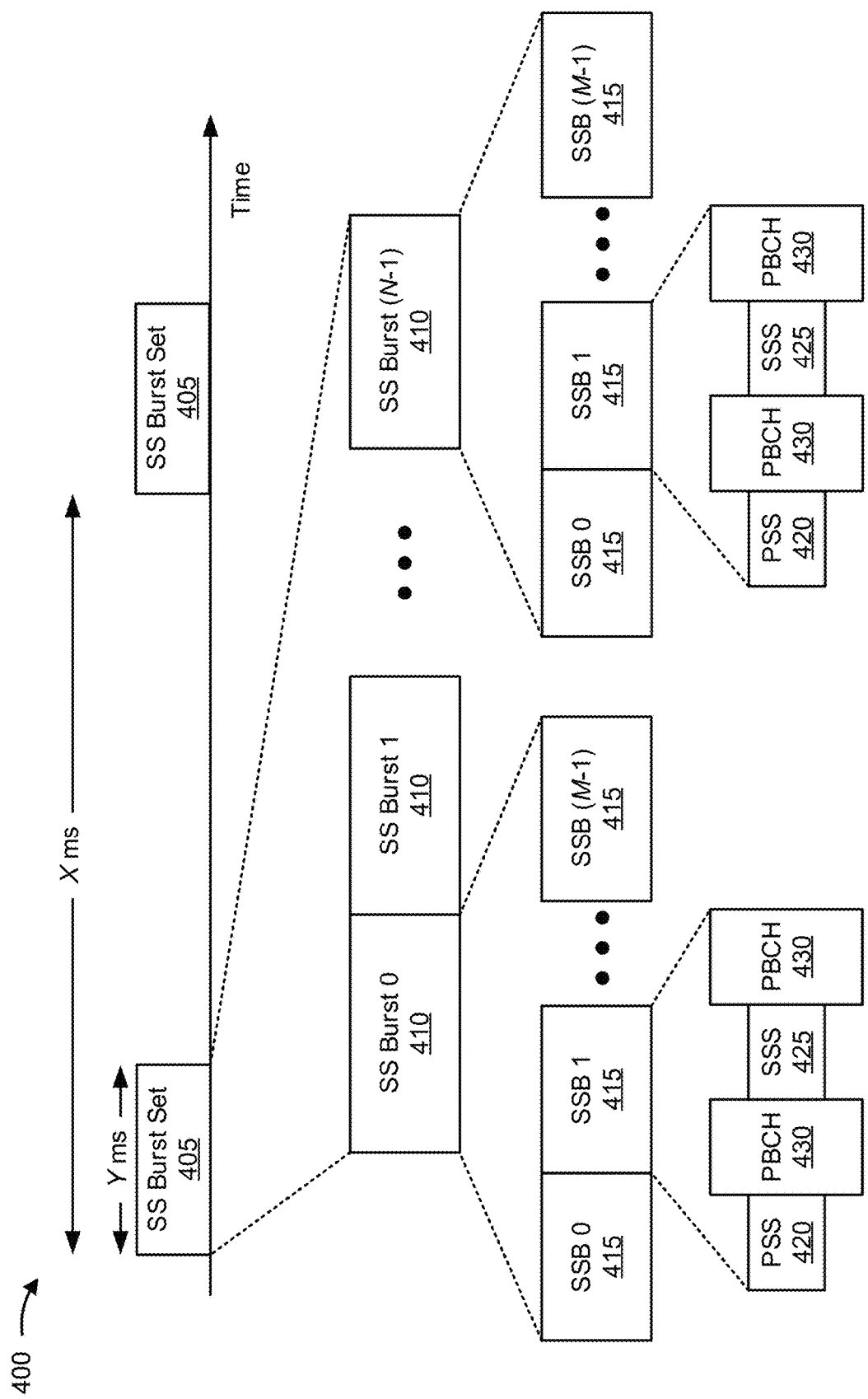
FIG. 4 is a diagram illustrating an example of a synchronization signal (SS) hierarchy, in accordance with the present disclosure.

FIG. 4 is a diagram illustrating an example of a synchronization signal (SS) hierarchy 400, in accordance with the present disclosure. As shown in FIG. 4, the SS hierarchy may include an SS burst set 405, which may include multiple SS bursts 410, shown as SS burst 0 through SS burst N−1, where N is a maximum quantity of repetitions of the SS burst 410 that may be transmitted by the base station. As further shown, each SS burst 410 may include one or more SS blocks (SSBs) 415, shown as SSB 0 through SSB M−1, where M is a maximum quantity of SSBs 415 that can be carried by an SS burst 410. In some examples, different SSBs 415 may be beam-formed differently (for example, transmitted using different beams), and may be used for cell search, cell acquisition, beam management, or beam selection (for example, as part of an initial network access procedure). An SS burst set 405 may be periodically transmitted by a wireless node (for example, a base station 110), such as every X milliseconds, as shown in FIG. 4. In some examples, an SS burst set 405 may have a fixed or dynamic length, shown as Y milliseconds in FIG. 4. In some cases, an SS burst set 405 or an SS burst 410 may be referred to as a discovery reference signal (DRS) transmission window or an SSB measurement time configuration (SMTC) window.

In some examples, an SSB 415 may include resources that carry a primary synchronization signal (PSS) 420, a secondary synchronization signal (SSS) 425, or a physical broadcast channel (PBCH) 430. In some examples, multiple SSBs 415 are included in an SS burst 410 (for example, with transmission on different beams), and the PSS 420, the SSS 425, or the PBCH 430 may be the same across each SSB 415 of the SS burst 410. In some examples, a single SSB 415 may be included in an SS burst 410. In some examples, the SSB 415 may be at least four symbols (for example, OFDM symbols) in length, where each symbol carries one or more of the PSS 420 (for example, occupying one symbol), the SSS 425 (for example, occupying one symbol), or the PBCH 430 (for example, occupying two symbols). In some cases, an SSB 415 may be referred to as an SS/PBCH block.

In some examples, the symbols of an SSB 415 are consecutive, as shown in FIG. 4. In some other examples, the symbols of an SSB 415 are non-consecutive. Similarly, in some examples, one or more SSBs 415 of the SS burst 410 may be transmitted in consecutive radio resources (for example, consecutive symbols) during one or more slots. Additionally or alternatively, one or more SSBs 415 of the SS burst 410 may be transmitted in non-consecutive radio resources.

In some examples, the SS bursts 410 may have a burst period, and the SSBs 415 of the SS burst 410 may be transmitted by a wireless node (for example, a base station 110) in accordance with the burst period. In such examples, the SSBs 415 may be repeated during each SS burst 410. In some examples, the SS burst set 405 may have a burst set periodicity, whereby the SS bursts 410 of the SS burst set 405 are transmitted by the wireless node in accordance with the fixed burst set periodicity. In other words, the SS bursts 410 may be repeated during each SS burst set 405.

In some examples, an SSB 415 may include an SSB index, which may correspond to a beam used to carry the SSB 415. A UE 120 may monitor for or measure SSBs 415 using different receive (Rx) beams during an initial network access procedure or a cell search procedure, among other examples. Based at least in part on the monitoring or measuring, the UE 120 may indicate one or more SSBs 415 with a best signal parameter (for example, an RSRP parameter) to a base station 110. The base station 110 and the UE 120 may use the one or more indicated SSBs 415 to select one or more beams to be used for communication between the base station 110 and the UE 120 (for example, for a random access channel (RACH) procedure). Additionally or alternatively, the UE 120 may use the SSB 415 or the SSB index to determine a cell timing for a cell via which the SSB 415 is received (for example, for a serving cell).

In some cases, an SSB may be associated with a CORESET (for example, a CORESET 0). For example, an SSB may serve as a source reference signal that provides beam information for the CORESET, such as quasi co-location (QCL) assumption information, among other examples, to be used by the UE to decode the CORESET (for example, to decode a demodulation reference signal (DMRS) included in the CORESET). The SSB may be multiplexed (for example, time division multiplexed or frequency division multiplexed) with the CORESET. An MIB (for example, the pdcch-ConfigSIB1 information element or the controlResourceSetZero information element) may indicate a multiplexing pattern for an SSB and a CORESET (for example, an initial CORESET or a CORESET 0).

Figure 5:
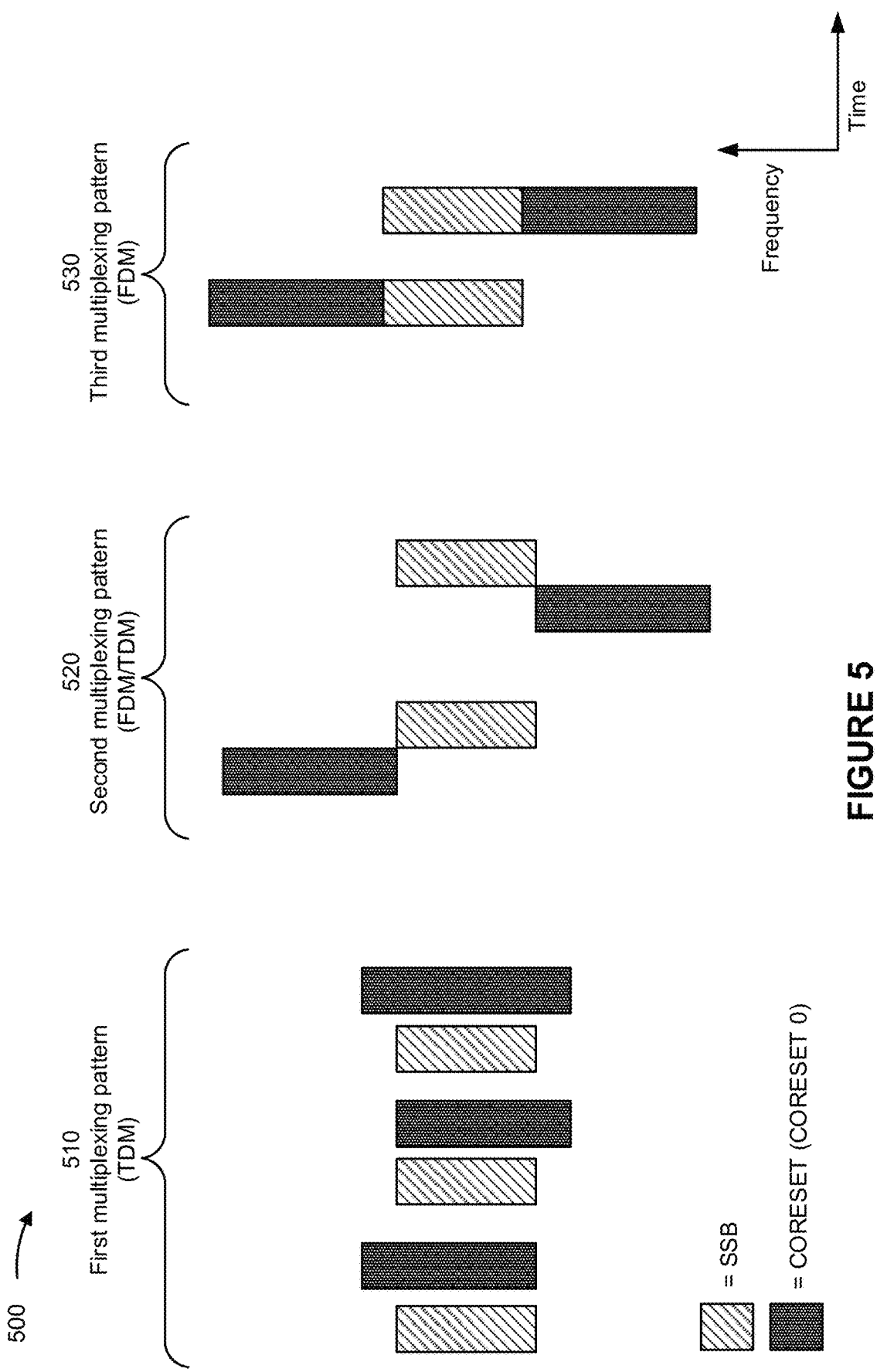
FIG. 5 is a diagram illustrating an example of multiplexing patterns for SS blocks (SSBs) and control resource sets (CORESETs), in accordance with the present disclosure.

FIG. 5 is a diagram illustrating an example of multiplexing patterns 500 for SSBs and CORESETs, in accordance with the present disclosure. As described elsewhere herein, an SSB and a CORESET (for example, a CORESET 0) may be multiplexed in the time domain or the frequency domain. For example, the SSB and the CORESET may be time division multiplexed (TDM'ed) or frequency division multiplexed (FDM'ed). A multiplexing pattern (for example, a time division multiplex (TDM) pattern or a frequency division multiplex (FDM) pattern) for the SSB and the CORESET may be indicated in configuration information for the CORESET (for example, in an MIB). One or more multiplexing patterns may be defined, or otherwise fixed, by a wireless communication standard, such as the 3GPP.

For example, an SSB and an initial CORESET (a CORESET 0) may be multiplexed to enable the SSB to serve as a reference point for defining a frequency domain resource allocation for the initial CORESET, as described above. Additionally or alternatively, an SSB and an initial CORESET may be multiplexed so that the SSB may serve as a source reference signal for providing beam information or QCL information for the CORESET.

For example, a first multiplexing pattern 510 may be a TDM pattern. For example, as shown in FIG. 5, the SSB and the CORESET may be multiplexed in the time domain. In some cases, a reference point for defining the frequency domain resource allocation for the CORESET may be an RB of the SSB associated with a highest index value or an RB of the SSB associated with a lowest index value. In some cases, a starting RB (or CCE) of the CORESET may be offset, in the frequency domain, from the RB of the SSB associated with the highest index value or the RB of the SSB associated with the lowest index value. The first multiplexing pattern 510 may be used when an SCS of the SSB and an SCS of the CORESET are the same or different. For example, the first multiplexing pattern 510 may be used when the SCS of the SSB is 120 kilohertz (kHz) and the SCS of the CORESET is 120 kHZ, when the SCS of the SSB is 240 kHz and the SCS of the CORESET is 60 kHZ, or when the SCS of the SSB is 240 kHz and the SCS of the CORESET is 120 kHZ, among other examples.

A second multiplexing pattern 520 may be a combination of a TDM pattern and an FDM pattern. For example, the SSB and the CORESET may be multiplexed in the time domain and the frequency domain. As shown in FIG. 5, the frequency domain resources used by the SSB and the CORESET may be contiguous (for example, the RBs allocated for the SSB may be contiguous with the RBs allocated for the CORESET), but the SSB and the CORESET may occupy different symbols in the time domain. In some cases, a starting RB (or CCE) of the CORESET may be offset, in the frequency domain, from the RB of the SSB associated with the highest index value or the RB of the SSB associated with the lowest index value (as shown in FIG. 5). The second multiplexing pattern 520 may be used when the SSB and the CORESET are associated with different SCSs.

A third multiplexing pattern 530 may be an FDM pattern. For example, the SSB and the CORESET may be multiplexed in the frequency domain. In some cases, a reference point for defining the frequency domain resource allocation for the CORESET may be an RB of the SSB associated with a highest index value or an RB of the SSB associated with a lowest index value. As shown in FIG. 5, the frequency domain resources used by the SSB and the CORESET may be contiguous (for example, the RBs allocated for the SSB may be contiguous with the RBs allocated for the CORESET) and the SSB and the CORESET may occupy at least one common symbol in the time domain. The third multiplexing pattern 530 may be used when the SCS of the SSB is the same as the SCS of the CORESET.

A multiplexing pattern to be applied (for example, among the first multiplexing pattern 510, the second multiplexing pattern 520, and the third multiplexing pattern 530) for a CORESET and SSB may be indicated by a base station to a UE via configuration information, such as an RRC configuration, system information, or an MIB, among other examples. For example, for an initial CORESET (a CORESET 0) the multiplexing pattern to be applied may be indicated in an MIB (for example, in a pdcch-ConfigSIB1 information element or a controlResourceSetZero information element of the MIB). The MIB may indicate a frequency offset (for example, from an RB of the SSB to identify a starting RB of the initial CORESET), a quantity of RBs associated with the initial CORESET, and a quantity of symbols associated with the CORESET. For example, the initial CORESET (CORESET 0) may include 1, 2, or 3 symbols, among other examples. The initial CORESET may include 24 RBs, 48 RBs, or 96 RBs, among other examples.

In some cases, a configuration of a CORESET 0 and a multiplexing pattern used for the CORESET 0 and an SSB may result in a frequency domain resource allocation for the CORESET 0 and the SSB exceeding a bandwidth associated with a UE (for example, an active or an initial downlink BWP or a maximum UE bandwidth). For example, a quantity of RBs allocated for the CORESET 0 and the SSB may exceed a quantity of RBs that can be supported or received (in accordance with the bandwidth associated with the UE) by the UE, as depicted and described in more detail in connection with FIG. 6.

FIG. 6 is a diagram illustrating an example of a partial CORESET 600, in accordance with the present disclosure. "Partial CORESET" may refer to a CORESET, configured at a UE, that is associated with a frequency domain resource allocation that is at least partially outside of a bandwidth (for example, an initial downlink BWP or a maximum UE bandwidth) of the UE. For example, in some cases, a UE may be associated with a smaller bandwidth because of a capability of the UE.

For example, in some cases, a base station may serve different UEs of different categories or different UEs that support different capabilities. For example, the base station may serve a first category of UEs that have a less advanced capability (such as a lower capability or a reduced capability) and a second category of UEs that have a more advanced capability (for example, a higher capability). A UE of the first category may have a reduced feature set compared to UEs of the second category, and may be referred to as a reduced capability (RedCap) UE, a low tier UE, or an NR-Lite UE, among other examples. A UE of the first category may be, for example, an MTC UE, an eMTC UE, or an IoT UE, as described above in connection with FIG. 1. A UE of the second category may have an advanced feature set compared to UEs of the second category, and may be referred to as a baseline UE, a high tier UE, an NR UE, or a premium UE, among other examples. In some aspects, a UE of the first category has capabilities that satisfy requirements of a first (earlier) wireless communication standard but not a second (later) wireless communication standard, while a UE of the second category has capabilities that satisfy requirements of the second (later) wireless communication standard (and also the first wireless communication standard, in some cases).

For example, UEs of the first category may support a lower maximum modulation and coding scheme (MCS) than UEs of the second category (such as quadrature phase shift keying (QPSK) as compared to 256-quadrature amplitude modulation (QAM)), may support a lower maximum transmit power than UEs of the second category, may have a less advanced beamforming capability than UEs of the second category (for example, may not be capable of forming as many beams as UEs of the second category), may require a longer processing time than UEs of the second category, may include less hardware than UEs of the second category (for example, fewer antennas, fewer transmit antennas, or fewer receive antennas), or may not be capable of communicating on as wide of a maximum BWP as UEs of the second category, among other examples. Additionally or alternatively, UEs of the second category may be capable of communicating using a shortened transmission time interval (TTI) (for example, a slot length of 1 ms or less, 0.5 ms, 0.25 ms, 0.125 ms, or 0.0625 ms, depending on a SCS), and UEs of the first category may not be capable of communicating using the shortened TTI.

Therefore, UEs of the first category (for example, reduced capability UEs) may be configured with an initial downlink BWP (for example, for initial access purposes) that is different than an initial downlink BWP for UEs of the second category. For example, the initial downlink BWP for UEs of the second category may be larger than the initial downlink BWP for UEs of the first category. For example, for initial access, a UE bandwidth 610 (or BWP) for a UE of the first category (for example, a reduced capability UE) may be limited to, or may not exceed, 100 megahertz (MHz).

As shown in FIG. 6, a CORESET 620 may be configured for the UE. For example, the UE may receive a configuration for the CORESET 620 via an MIB. The CORESET 620 may be an initial CORESET or a CORESET 0. The CORESET 620 may be multiplexed with an SSB. For example, as shown in FIG. 6, the CORESET 620 may multiplexed with an SSB in accordance with the third multiplexing pattern 530. FIG. 6 depicts an example configuration for the CORESET 620 that includes two PDCCH candidates (for example PDCCH candidate 1 and PDCCH candidate 2), each PDCCH candidate having an aggregation level (AL) of 4 (for example, each PDCCH candidate is associated with 4 CCEs). As shown in FIG. 6, the CORESET may be associated with interleaved CCE-to-REG mapping (for example, consecutive CCE indices may be mapped to non-consecutive REGs).

As shown in FIG. 6, a portion of the frequency domain resource allocation (for example, one or more CCEs) of the CORESET may be outside of the UE bandwidth 610 of a UE (for example, a reduced capability UE). For example, the UE bandwidth 610 may be associated with a quantity of RBs or a quantity of MHz (for example, for a 100 MHz maximum bandwidth, the quantity of RBs may be 66). A frequency range or a quantity of RBs associated with the SSB and the CORESET 620 may exceed the quantity of RBs or a quantity of MHz associated with the UE bandwidth 610. For example, some CORESET 0 configuration may result in an SSB/CORESET configuration that is larger, in the frequency domain, than the UE bandwidth 610. While FIG. 6 shows an example, of a CORESET configuration that is associated with 2 PDCCH candidates, an aggregation level of 4, and the third multiplexing pattern 530, other CORESET configurations may similarly result in a partial CORESET, such as CORESET configurations that use the second multiplexing pattern 520, among other examples.

Because the portion of the frequency domain resource allocation (for example, one or more CCEs) of the CORESET may be outside of the UE bandwidth 610, the UE may be unable to receive or decode CCEs or RBs 630 of the CORESET 620. For example, in the example depicted in FIG. 6, the UE may be unable to receive CCEs with index values of 1 and 3 (associated with the PDCCH candidate 1) and 5 and 7 (associated with the PDCCH candidate 2). The UE may receive and decode CCEs with index values of 0 and 2 (associated with the PDCCH candidate 1) and 4 and 6 (associated with the PDCCH candidate 2) because the CCEs are within the UE bandwidth 610. Because the UE may be unable to receive a portion of the CORESET 620, a communication performance of the UE may be degraded. For example, an aggregation level of the PDCCH candidates associated with the CORESET 620 may be reduced (for example, to an aggregation level of 2 in the example shown in FIG. 6). The reduced aggregation level may cause a degradation in the communication performance of the UE.

Various aspects relate generally to partial CORESET handling. Some aspects more specifically relate to receiving, by a UE, PDCCH messages associated with a partial CORE- SET based at least in part on modifying a resource mapping of the partial CORESET or modifying an initial downlink bandwidth of the UE. For example, in some aspects, the UE may modify a CCE-to-REG mapping using a quantity of available RBs associated with the initial downlink bandwidth. In some aspects, the UE may modify a CCE-to-REG mapping type of the partial CORESET to a non-interleaving mapping type. In some other aspects, the UE may modify a frequency range associated with the initial downlink bandwidth to include the frequency domain resource allocation for the partial CORESET based at least in part on receiving an SSB (for example, after receiving the SSB).

In some aspects, the UE may receive the PDCCH messages associated with a partial CORESET based at least in part on identifying a starting RB of the partial CORESET (for example, when the starting RB is outside of the initial downlink bandwidth of the UE). The UE may identify the starting RB based at least in part on reducing a quantity of resource blocks associated with the frequency domain resource allocation for the CORESET based at least in part on a quantity of available resource blocks in the initial downlink bandwidth. In some aspects, the UE may identify the starting RB based at least in part on using common resource block index values (rather than RB index values associated with the initial downlink bandwidth) and a resource block offset indicated by configuration information for the partial CORESET. In some other aspects, the UE may identify the starting RB based at least in part on virtually extending resource block indices associated with the initial downlink bandwidth (for example, by extending index value associated with the initial downlink bandwidth to negative values or values that exceed the configured index values for the initial downlink bandwidth).

In some aspects, the UE may receive an indication of an action to be performed by the UE when the frequency domain resource allocation for a CORESET is at least partially outside of the initial downlink bandwidth (for example, when the CORESET is a partial CORESET). The UE may receive the indication of the action to be performed via a CORESET zero configuration (for example, the controlResourceSetZero information element) included in a PDCCH configuration (for example, in the pdcch-ConfigSIB1 information element) indicated by an MIB that configures the CORESET, via the MIB that configures the CORESET, via a system information block (SIB), or via dedicated signaling, among other examples.

Particular aspects of the subject matter described in this disclosure can be implemented to realize one or more of the following potential advantages. In some examples, the described techniques can be used to maintain an aggregation level of PDCCH candidates of a CORESET when a frequency domain resource allocation for the CORESET is at least partially outside of an initial downlink bandwidth of a UE (for example, when the CORESET is a partial CORESET). Maintaining the aggregation level of the PDCCH candidate(s) may improve communication performance associated with receiving PDCCH messages associated with the CORESET. In some aspects, the described techniques can be used to maintain a quantity of PDCCH candidates associated with the CORESET. Maintaining the quantity of PDCCH candidates may improve a PDCCH capacity associated with receiving PDCCH messages associated with the CORESET. In some aspects, the described techniques can be used to remove ambiguity associated with a starting frequency domain resource (for example, a starting RB) of a CORESET when the starting RB is outside of the initial downlink bandwidth of the UE. This may enable the UE to map resources (for example, RBs or CCEs) to the CORESET, monitor the CORESET (and associated search space (s)), and receive one or more PDCCH messages associated with the CORESET.

Figure 7A:
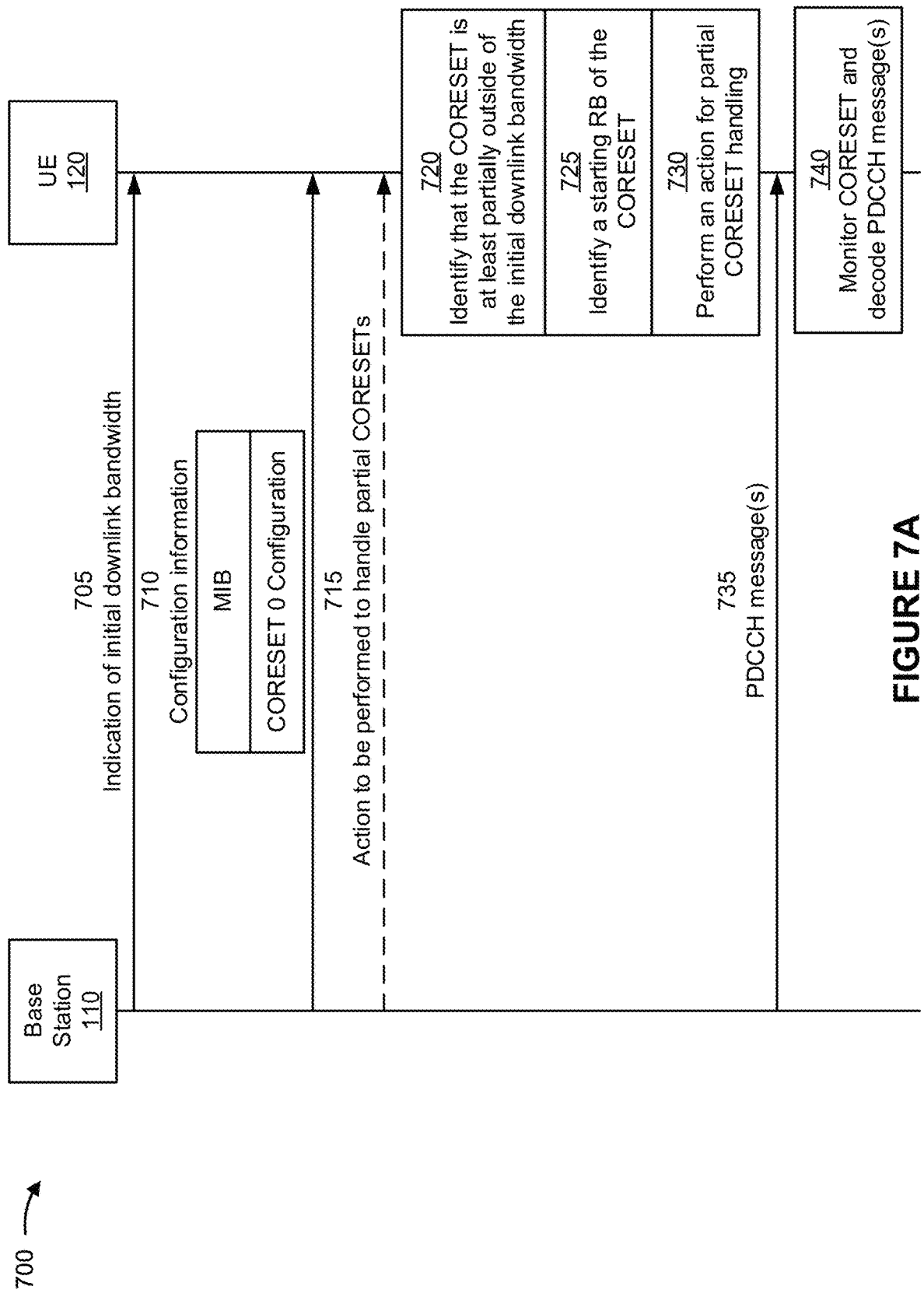
FIGS. 7A and 7B are diagrams illustrating an example associated with partial CORESET handling, in accordance with the present disclosure.
Figure 7B:
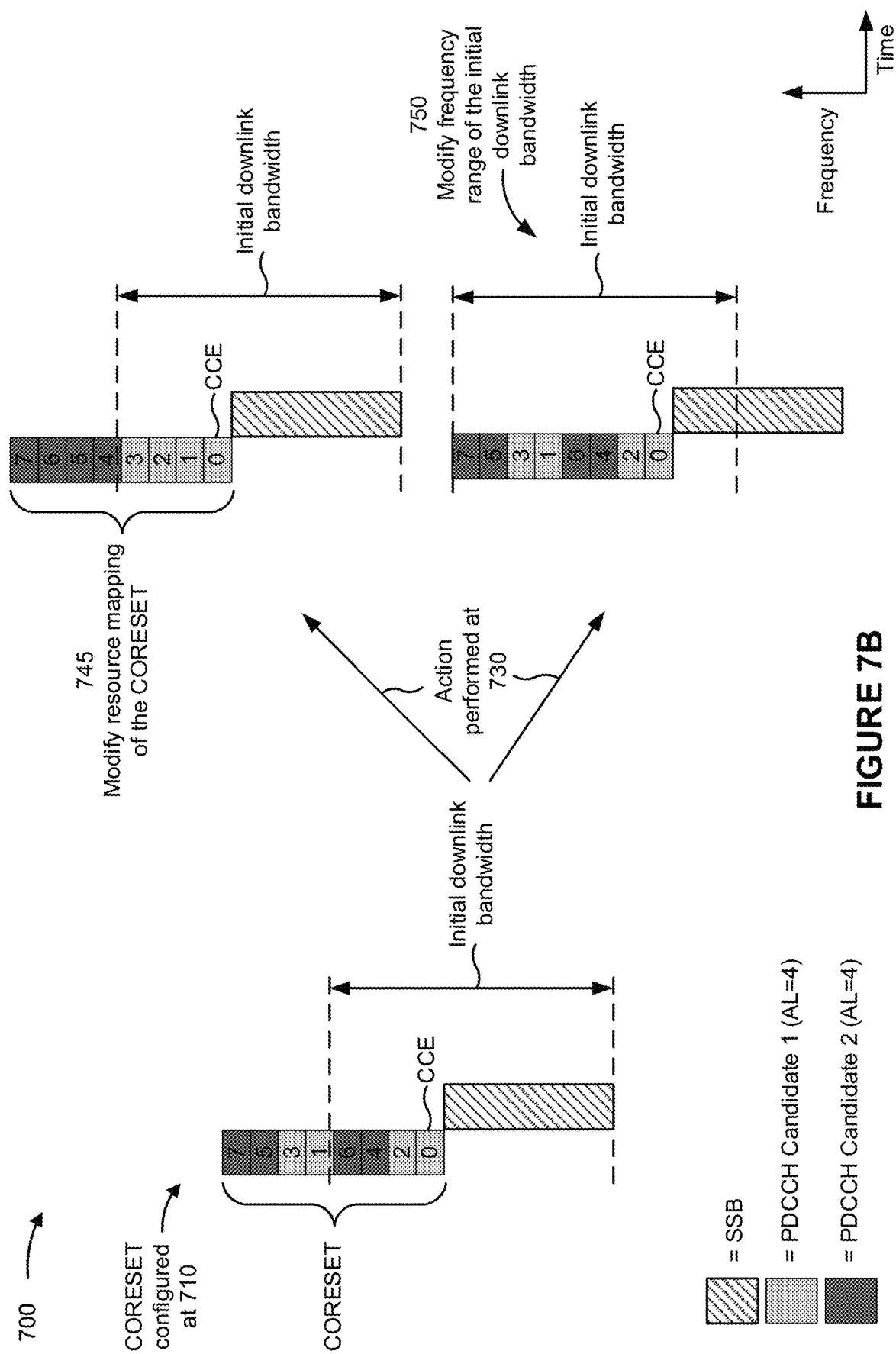

FIGS. 7A and 7B are diagrams illustrating an example associated with partial CORESET handling 700, in accordance with the present disclosure. As shown in FIG. 7A, a base station 110 and a UE 120 may communicate with one another in a wireless network, such as the wireless network 100. In some aspects, the UE 120 may be a reduced capability UE. For example, the UE 120 may be associated with the first category of UEs described elsewhere herein.

In a first operation 705, the base station 110 may transmit, and the UE 120 may receive, an indication of an initial downlink bandwidth. "Initial downlink bandwidth" may refer to a BWP or a bandwidth that is to be used by the UE 120 for initial access purposes. "Initial access" may refer to a communication state between the UE 120 and the base station 110 that occurs prior to the UE 120 establishing a connection, such as an RRC connection, with the base station 110. The initial downlink bandwidth may be an initial downlink BWP that is configured (for example, via an MIB or other signaling) for the UE 120 to be used for initial access purposes (for example, for acquiring a channel or for performing random access channel procedures). In some aspects, the initial downlink bandwidth may be a maximum bandwidth that the UE 120 may use for initial access purposes (for example, as indicated by the base station 110, as determined by the UE 120 based at least in part on a configuration of the UE 120, or as defined (or otherwise fixed) by a wireless communication standard). In some aspects, the initial downlink bandwidth may be associated with reduced capability UEs (or UEs included in the first category of UEs described elsewhere herein). For example, a first initial downlink BWP may be configured (for example, by the base station 110) for reduced capability UEs (or for UEs included in the first category of UEs) and a second initial downlink BWP may be configured (for example, by the base station 110) for UEs included in the second category of UEs described elsewhere herein. The first initial downlink BWP may be associated with less radio resources (for example, less frequency domain resources or less time domain resources) that the second initial downlink BWP.

For example, the initial downlink bandwidth for reduced capability UEs (or UEs included in the first category of UEs) may be limited in a frequency range to reduce a complexity associated with initial access procedures for reduced capability UEs. For example, the initial downlink bandwidth may be limited to a size of 100 MHz, among other examples. As described elsewhere herein, the size of the initial downlink bandwidth may result in a portion of a CORESET (for example, an initial CORESET or a CORESET 0) being configured outside of the initial downlink bandwidth. For example, as depicted and described in connection with FIG. 6, a size of the initial downlink bandwidth may result one or more RBs or CCEs of the CORESET 0 being mapped to frequency domain resources that are outside of the initial downlink bandwidth, resulting in a partial CORESET being configured.

In a second operation 710, the base station 110 may transmit, and the UE 120 may receive, configuration information. For example, the base station 110 may transmit (broadcast), the UE 120 may receive, an MIB that carries the configuration information (for example, in a PDCCH configuration indicated by the MIB). The configuration information may be associated with a CORESET that is associated PDCCH monitoring for initial access. For example, the configuration information may indicate a configuration for an initial CORESET or a CORESET 0 (for example, in a controlResourceSetZero information element). The configuration information may indicate a multiplexing pattern associated with the CORESET 0, a quantity of symbols associated with the CORESET 0, a quantity of RBs associated with the CORESET 0, or a frequency offset associated with the CORESET 0, among other examples.

For example, the controlResourceSetZero information element may indicate an index value that corresponds to a configuration table. The configuration table may include the multiplexing pattern associated with the CORESET 0, the quantity of symbols associated with the CORESET 0, the quantity of RBs associated with the CORESET 0, or the frequency offset associated with the CORESET 0, among other examples. The configuration tables may be defined, or otherwise fixed, by a wireless communication standard (such as one or more configuration tables included in 3GPP Technical Specification 38.213). Because the configuration information may be transmitted via the MIB, the configuration for the CORESET 0 may be common for all UEs within a cell associated with the base station 110 (for example, for all reduced capability UEs within the cell associated with the base station 110). In other words, because the configuration information may be transmitted (for example, broadcast) via the MIB, the base station 110 may be unable to customize or alter the configuration for the CORESET 0 to ensure that the CORESET 0 is entirely included in the initial downlink bandwidth of the UE 120.

In some aspects, the indication of the initial downlink bandwidth (transmitted in the first operation 705) may be included in the MIB (transmitted in the second operation 710). In other words, the first operation 705 and the second operation 710 may be a single transmission (for example, the same MIB may transmit information described above in connection with the first operation 705 and the second operation 710). In some other aspects, the indication of the initial downlink bandwidth (transmitted in the first operation 705) may be included in a separate signal from the MIB (transmitted in the second operation 710).

In a third operation 715, the base station 110 may transmit, and the UE 120 may receive, an indication of an action to be performed by UEs 120 to handle partial CORESETs. For example, the base station 110 may transmit, and the UE 120 may receive, an indication of an action to be performed by UEs 120 when the frequency domain resource allocation for a CORESET is at least partially outside of an initial downlink bandwidth. The third operation 715 may be an optional operation, as indicated by the dashed arrow in FIG. 7A. For example, in some aspects, the action to be performed by UEs 120 to handle partial CORESETs may be based at least on one or more preconfigured rules (for example, rules defined, or otherwise fixed, by a wireless communication standard, such as the 3GPP). Therefore, the action to be performed by UEs 120 to handle partial CORESETs may be specified (for example, by the wireless communication standard) and may not need to be indicated by the base station 110.

The base station 110 may transmit the indication of the action to be performed by UEs 120 to handle partial CORESETs via an MIB (for example, the MIB transmitted in the second operation 710). For example, the base station 110 may transmit the indication of the action to be performed by UEs 120 to handle partial CORESETs via a CORESET zero configuration (a controlResourceSetZero information element) included in a PDCCH configuration (a pdcch-ConfigSIB1 information element) indicated by the MIB. For example, a bit (for example, a most significant bit (MSB)) of the CORESET zero configuration may be used to indicate the action to be performed by UEs 120 to handle partial CORESETs. In some other aspects, the base station 110 may transmit the indication of the action to be performed by UEs 120 to handle partial CORESETs via another bit of the MIB (for example, a bit that was previously reserved for future purposes as defined, or otherwise fixed, by a wireless communication standard). In some other aspects, the base station 110 may transmit the indication of the action to be performed by UEs 120 to handle partial CORESETs via a SIB, such as SIB1 (as defined by a wireless communication standard) or another SIB. In some other aspects, the base station 110 may transmit the indication of the action to be performed by UEs 120 to handle partial CORESETs via dedicated signaling, such as RRC signaling, medium access control (MAC) signaling, or downlink control information (DCI) signaling, among other examples (for example, for cases in which a partial CORESET is configured for the UE 120 after an initial access stage).

The action to be performed by UEs 120 to handle partial CORESETs may include refraining from receiving CCEs or RBs of the CORESET that are outside of the initial downlink bandwidth, modifying the resource mapping of the CORESET, or modifying the initial downlink bandwidth, among other examples. For example, the action to be performed by UEs 120 to handle partial CORESETs may include modifying the resource mapping includes modifying the CCE-to-REG mapping of the CORESET. In some aspects, the action to be performed by UEs 120 to handle partial CORESETs may include modifying a mapping type of the CCE-to-REG mapping of the CORESET between a non-interleaving mapping type and an interleaving mapping type. In some other aspects, the action to be performed by UEs 120 to handle partial CORESETs may include shifting a frequency range of the initial downlink bandwidth to include the frequency domain resource allocation of the CORESET (for example, after successfully receiving and decoding an SSB associated with the CORESET).

In some aspects, the action to be performed by UEs 120 to handle partial CORESETs may include an action to identify a starting RB of the CORESET. For example, when a portion of the frequency domain resource allocation of the CORESET is outside of the initial downlink bandwidth, a starting RB (for example, an RB associated with a lowest index value or an index value of 0) may be located outside of the initial downlink bandwidth. In some cases, the UE 120 may use indexing that is associated with the initial downlink bandwidth. For example, RBs may be indexed, starting at an index value of zero, at a first RB of the initial downlink bandwidth and the indexing of RBs may stop at a last RB of the initial downlink bandwidth. Therefore, when the starting RB of the CORESET is outside of the initial downlink bandwidth, the UE 120 may be unable to map resources for the CORESET or identify a location of the CORESET because the starting RB of the CORESET is not given index value associated with the initial downlink bandwidth. Therefore, in some aspects, the action to be performed by UEs 120 to handle partial CORESETs may include an action to identify the starting RB of the CORESET. The action to be performed to identify the starting RB of the CORESET may be specified (for example, in a wireless communication standard) or indicated by the base station 110, in a similar manner as described elsewhere herein. The action(s) to be performed by UEs 120 to handle partial CORESETs are explained in more detail elsewhere herein.

In a fourth operation 720, the UE 120 may identify that the CORESET (for example, configured by the configuration information or the MIB in the second operation 710) is at least partially outside of the initial downlink bandwidth of the UE 120 (as described in connection with the first operation 705). For example, the frequency domain resource allocation for the CORESET may be at least partially outside of the initial downlink bandwidth. The UE 120 may identify that the CORESET is a partial CORESET based at least in part on identifying that the frequency domain resource allocation for the CORESET is at least partially outside of the initial downlink bandwidth of the UE 120. The UE 120 may identify that the frequency domain resource allocation for the CORESET is at least partially outside of the initial downlink bandwidth based at least in part on the configuration information. For example, the UE 120 may perform resource mapping to identify the frequency domain resource allocation for the CORESET based at least in part on information indicated in the configuration information (such as in the MIB) and based at least in part on one or more configuration tables (for example, that are defined, or otherwise fixed, by a wireless communication standard). Based at least in part on performing the resource mapping (or on identifying the starting RB of the CORESET as described in more detail elsewhere herein), the UE 120 may identify the frequency domain resource allocation for the CORESET. If the frequency domain resource allocation for the CORESET is at least partially outside of the initial downlink bandwidth of the UE 120, then the UE 120 may determine that one or more actions should be performed to handle the partial CORESET.

In a fifth operation 725, the UE 120 may identify a starting RB of the CORESET. For example, the UE 120 may identify the starting RB of the CORESET based at least in part on the configuration information. As described above, "starting RB" may refer to an RB associated with the CORESET with a lowest index value or an index value of 0. For example, the configuration information may indicate a frequency offset associated with the CORESET that indicates the starting RB of the CORESET with respect to a first or last RB of an associated SSB (for example, as indicated in the configuration table(s) of 3GPP Technical Specification 38.213). The frequency offset may indicate a quantity of RBs from the first or last RB of an associated SSB (a multiplexed SSB) to indicate the starting RB of the CORESET. In some aspects, a value of the frequency offset may result in the starting RB of the CORESET being outside of the initial downlink bandwidth of the UE 120.

In some aspects, the UE 120 may use RB indices that are associated with the initial downlink bandwidth. For example, index values may be mapped, starting from a first RB of the initial downlink bandwidth, and ending at a last RB of the initial downlink bandwidth. Therefore, when the starting RB of the CORESET is outside of the initial downlink bandwidth, the UE 120 may be unable to determine an RB that should be mapped to the first RB of the CORESET (for example, because there may be no index value associated with that RB that is outside of the initial downlink bandwidth).

In some aspects, in the fifth operation 725 to identify the starting RB of the CORESET, the UE 120 may reduce a quantity of RBs associated with the frequency domain resource allocation for the CORESET based at least in part on a quantity of available RBs, or available CCEs, in the initial downlink bandwidth. "Available RBs" or "available resource blocks" may refer to RBs that can be used to receive the CORESET within the initial downlink bandwidth. Similarly, "available CCEs" may refer to CCEs that can be used to receive the CORESET within the initial downlink bandwidth. For example, in some cases, the available RBs may be RBs originally allocated for the CORESET minus a quantity of RBs that are outside of the initial downlink bandwidth as originally configured. In some aspects, the available RBs may be a quantity of RBs in the initial downlink bandwidth minus a quantity of RBs (or a portion of the quantity of RBs) allocated to an SSB that is multiplexed with the CORESET. The UE 120 may determine that the quantity of RBs associated with the CORESET is the quantity of available RBs. For example, if the configuration information indicates that the CORESET is associated with 48 RBs, but only 24 RBs are within the initial downlink bandwidth, then the UE 120 may determine that the CORESET is associated with 24 RBs (rather than 48 RBs). The UE 120 may perform resource mapping based at least in part on other information indicated by the configuration information, based at least in part on the reduced quantity of RBs, or based at least in part on one or more configuration tables, to identify the starting RB of the CORESET. For example, by reducing the quantity of RBs associated with the CORESET as described herein, the UE 120 may ensure that the starting RB of the CORESET is included within the initial downlink bandwidth.

In some aspects, in the fifth operation 725 to identify the starting RB of the CORESET, the UE 120 may use common resource block index values and a resource block offset indicated by the configuration information. "Common resource block index values" or "common RB index values" may refer to index values that are defined from a first RB of a carrier bandwidth, rather than from a first RB of the initial downlink bandwidth (which may be a portion of the carrier bandwidth). For example, the first RB of the carrier bandwidth may be referred to as common RB (CRB) zero, as CRB0, or as Point A, among other examples. Common RB index values may define index values for all RBs included in the carrier bandwidth, starting from the CRB0 or the Point A. Therefore, rather than using index values associated with the initial downlink bandwidth (for example, index values associated with an initial downlink BWP of the UE 120), the UE 120 may use the common RB index values to identify the starting RB of the CORESET. This may enable the UE 120 to map the starting RB of the CORESET to an RB identified by a common RB index value when that RB may not have an index value associated with the initial downlink bandwidth. This enables the UE 120 to identify the starting RB of the CORESET when the starting RB is outside of the initial downlink bandwidth.

In some aspects, in the fifth operation 725 to identify the starting RB of the CORESET, the UE 120 may virtually extend RB indices associated with the initial downlink bandwidth. "Virtually" extending RB indices may refer to the UE 120 assigning (for example, autonomously or without receiving an indication to do so from the base station 110) index values to RBs that do not otherwise have an RB index value associated with the initial downlink bandwidth. For example, the UE 120 may assign negative index values (for example below 0) may be extend index values to RBs outside of the initial downlink bandwidth. For example, if the initial downlink bandwidth includes RBs with index values from 0 to 50, then the UE 120 may assign negative index values (for example, −1, −2, or −3) to RBs that have a frequency lower than the frequency of the RB associated with the index value of 0. Similarly, the UE 120 may assign index values greater than 50 (for example, 51, 52, or 53) to RBs that have a frequency greater than the frequency of the RB associated with the index value of 50. In this way, the UE 120 may be enabled to identify index value for RBs that are outside of the initial downlink bandwidth. Therefore, the UE 120 may be enabled to identify an index value for the starting RB of the CORESET and may appropriately map the RBs of the CORESET to RBs of the carrier bandwidth or the initial downlink bandwidth.

Identifying the starting RB of the CORESET may enable the UE 120 to map RBs of the carrier bandwidth or the initial downlink bandwidth to the CORESET. This may enable the UE 120 to monitor the RBs associated with the CORESET (for example, to monitor search spaces or PDCCH candidates associated with the CORESET). Monitoring the CORESET or the associated search spaces may enable the UE 120 to receive PDCCH messages, as explained in more detail elsewhere herein.

In a sixth operation 730, the UE 120 may perform an action for partial CORESET handling. For example, the UE 120 may perform an action associated with RBs or CCEs of the CORESET that are outside of the initial downlink bandwidth of the UE 120. In some aspects, the action may include refraining from monitoring the RBs or CCEs of the CORESET that are outside of the initial downlink bandwidth. For example, the UE 120 may not be expected to monitor, or receive PDCCH messages in, the RBs or CCEs of the CORESET that are outside of the initial downlink bandwidth. Refraining from monitoring, or refraining from receiving PDCCH messages in, the RBs or CCEs of the CORESET that are outside of the initial downlink bandwidth may reduce a complexity associated with handling partial CORESETs. Reducing the complexity may be beneficial because the UE 120 may be a reduced capability UE, as described elsewhere herein. Moreover, refraining from monitoring, or refraining from receiving PDCCH messages in, the RBs or CCEs of the CORESET that are outside of the initial downlink bandwidth may ensure that a quantity of PDCCH candidates is maintained (for example, because a resource mapping is not modified), resulting in a PDCCH capacity of the CORESET being maintained.

In some aspects, the sixth operation 730 may include the UE 120 modifying a resource mapping of the CORESET. For example, the UE 120 may modify a CCE-to-REG mapping of the CORESET. In some aspects, modifying the resource mapping of the CORESET may include performing CCE-to-REG mapping using a quantity of available resource blocks, or a quantity of available CCEs, in the initial downlink bandwidth. For example, the UE 120 may identify the quantity of available RBs, or a quantity of available CCEs, in the initial downlink bandwidth for the CORESET, as explained in more detail elsewhere herein. The UE 120 may determine the CCE-to-REG mapping using the quantity of available RBs or the quantity of available CCEs (rather than the quantity of RBs or CCEs indicated by the configuration information). For example, the UE 120 may determine the CCE-to-REG mapping using the quantity of available RBs or the quantity of available CCEs using one or more preconfigured rules (for example, rules defined, or otherwise fixed, by a wireless communication standard, such as the 3GPP). Determining or recalculating the CCE-to-REG mapping using the quantity of available RBs or the quantity of available CCEs may result in an aggregation level for at least one PDCCH candidate of the CORESET being maintained (for example, as depicted and described in more detail in connection with FIG. 7B).

In some aspects, the sixth operation 730 may include the UE 120 modifying the CCE-to-REG mapping type of the CORESET. For example, the CORESET (as a CORESET 0) may be configured to use interleaving CCE-to-REG mapping. The UE 120 may modify the CCE-to-REG mapping type to a non-interleaving mapping type. The UE 120 may perform the CCE-to-REG mapping for the CORESET using the non-interleaving mapping type. Using the non-interleaving mapping type may increase (or maintain) an aggregation level for at least one PDCCH candidate as compared to an aggregation level that would have otherwise been experienced using the interleaving mapping type (for example, as depicted and described in more detail in connection with FIG. 7B). In some other aspects, the UE 120 may modify the CCE-to-REG mapping type of the CORESET from the non-interleaving mapping type to the interleaving mapping type. Using the interleaving mapping type may increase (or maintain) a quantity of PDCCH candidates as compared to a quantity of PDCCH candidates that would otherwise have been received using the non-interleaving mapping type. Increasing (or maintaining) the quantity of PDCCH candidates may increase (or maintain) a PDCCH capacity associated with the CORESET.

In some aspects, the sixth operation 730 may include the UE 120 modifying a frequency range associated with the initial downlink bandwidth to include the frequency domain resource allocation for the CORESET. The UE 120 may modify the frequency range associated with the initial downlink bandwidth to include the frequency domain resource allocation for the CORESET based at least in part on receiving or successfully decoding an SSB. For example, as described elsewhere herein, the CORESET (for example, a CORESET 0) may be multiplexed with an SSB. The base station 110 may transmit, and the UE 120 may receive, the SSB associated with the PDCCH monitoring for initial access (for example, the SSB associated with, or multiplexed with, the CORESET). After receiving the SSB, the UE 120 may modify the frequency range associated with the initial downlink bandwidth to include the frequency domain resource allocation for the CORESET. For example, the UE 120 may shift or hop the range of frequencies associated with the initial downlink bandwidth to include the frequency domain resource allocation for the CORESET. In other words, the UE 120 may not increase a size of the initial downlink bandwidth, but may modify the range of frequencies associated with the initial downlink bandwidth (for example, as depicted and described in more detail in connection with FIG. 7B). Modifying the frequency range associated with the initial downlink bandwidth may enable the UE 120 to monitor the full frequency domain resource allocation for the CORESET and to receive one or more PDCCH messages transmitted in resource(s) associated with the CORESET.

In some aspects, the UE 120 may identify a precoder granularity associated with the CORESET. In some aspects, the UE 120 may identify the precoder granularity associated with the CORESET based at least in part on one or more action(s) performed by the UE 120 to handle the partial CORESET. In some aspects, the base station 110 may transmit, and the UE 120 may receive, an indication of the precoder granularity associated with the CORESET. In some aspects, the UE 120 may identify the precoder granularity based at least in part on one or more preconfigured rules (for example, as defined, or otherwise fixed, by a wireless communication standard, such as the 3GPP).

The precoder granularity may indicate a precoding that is to be applied to REG or RBs associated with the CORESET. For example, the precoder precoder granularity may indicate that all RBs of an REG (or an REG bundle) use the same precoding. In such examples, each REG or each REG bundle of the CORESET may be associated with a DMRS (which may be referred to as using local DMRSs). For example, in other contexts, a precoder granularity that indicates that all RBs of an REG (or an REG bundle) use the same precoding may be indicated via aprecoderGranularity parameter indicating sameAsREG-bundle (for example, as defined, or otherwise fixed, by a wireless communication standard). In some other aspects, the precoder granularity may indicate that all RBs in the CORESET use the same precoding. In such examples, a single DMRS may be used for all RBs in the CORESET (which may be referred to as using a wideband DMRS). For example, in other contexts, a precoder granularity that indicates that all RBs in the CORESET use the same precoding use the same precoding may be indicated via a precoderGranularity parameter indicating all-ContiguousRBs (for example, as defined, or otherwise fixed, by a wireless communication standard).

If the UE 120 identifies (for example, determines or receives an indication that) the precoder granularity associated with the CORESET is all contiguous resource blocks associated with the CORESET (for example, that a wideband DMRS is used), then the UE 120 may receive a DMRS using available resource blocks, or a quantity of available CCEs, in the initial downlink bandwidth. In other words, if a wideband DMRS is used for the CORESET, then the UE 120 may assume that the DMRS is restricted to the CCEs or RBs that the UE 120 is able to receive (for example, the CCEs or RBs that are within the initial downlink bandwidth).

In a seventh operation 735, the base station 110 may transmit, and the UE 120 may receive, one or more PDCCH messages. The PDCCH messages may be transmitted using radio resources (time domain resources and frequency domain resources) associated with the CORESET. The one or more PDCCH messages may include system information, a SIB, an RRC message, or a DCI message, among other examples. For example, in an eighth operation 740, the UE 120 may monitor the CORESET and decode the one or more PDCCH messages. For example, based at least in part on performing one or more actions described herein, the UE 120 may be enabled to monitor the CORESET (for example, the partial CORESET that was configured at least partially outside of the initial downlink bandwidth of the UE 120), or associated search spaces. The UE 120 may detect a PDCCH message (for example, in a PDCCH candidate) based at least in part on monitoring the CORESET. The UE 120 may decode and receive the PDCCH message based at least in part on monitoring the CORESET and detecting the PDCCH message.

The UE 120 may receive the one or more PDCCH messages based at least in part on performing an action associated with a CORESET that has a frequency domain resource allocation that is at least partially outside of the initial downlink bandwidth. For example, the UE 120 may receive the one or more PDCCH messages based at least in part on monitoring the CORESET based at least in part on modifying the resource mapping of the CORESET. In some aspects, the UE 120 may receive the one or more PDCCH messages based at least in part on monitoring the CORESET based at least in part on modifying the frequency range associated with the initial downlink bandwidth.

As shown in FIG. 7B, example actions to be performed by the UE 120 to handle a partial CORESET are depicted. For example, the CORESET as configured in the second operation 710 may be a partial CORESET that includes frequency domain resources that are at least partially outside of the initial downlink bandwidth of the UE 120. For example, as shown in FIG. 7B, the CORESET may include two PDCCH candidates (for example, PDCCH candidate 1 and PDCCH candidate 2). Each PDCCH candidate may have an aggregation level of 4. The CORESET may use an interleaving CCE-to-REG mapping type. As shown in FIG. 7B, the CCE indices of 1, 3, 5, and 7 may be outside of the initial downlink bandwidth of the UE 120.

In the sixth operation 730, the UE 120 may perform one or more actions, as described above. For example, the sixth operation 730 may include a ninth operation 745. In the ninth operation 745, the UE 120 may modify a resource mapping of the CORESET. For example, the UE 120 may modify the resource mapping by reducing the quantity of RBs or the quantity of CCEs to the quantity of available resources (the available RBs or the available CCEs) in the initial downlink bandwidth, as described elsewhere herein. The UE 120 may perform CCE-to-REG mapping for the CORESET using the reducing quantity of RBs or CCEs. For the example depicted in FIG. 7B, this may result in a CCE-to-REG mapping as shown, with CCE indices 0, 1, 2, and 3 being included within the initial downlink bandwidth. As a result, the aggregation level of the PDCCH candidate 1 may be maintained at 4 (compared to being reduced to 2 as originally configured). In some other aspects, in the ninth operation 745 the UE 120 may modify the resource mapping type to the non-interleaving mapping type. For example, the UE 120 may map CCEs of a PDCCH candidate to consecutive REGs. This may result in a CCE-to-REG mapping as shown, with CCE indices 0, 1, 2, and 3 being included within the initial downlink bandwidth. As a result, the aggregation level of the PDCCH candidate 1 may be maintained at 4 (compared to being reduced to 2 as originally configured). Therefore, modifying the CCE-to-REG mapping of the CORESET when a portion of the CORESET is outside of the initial downlink bandwidth may increase an aggregation level of at least one PDCCH candidate (as compared to the originally configured CORESET). This may improve a communication performance of the UE 120 because the increased aggregation level is used.

In some aspects, the sixth operation 730 may include a tenth operation 750. In the tenth operation 750, the UE 120 may modify a frequency range of the initial downlink bandwidth to include the frequency domain resource allocation of the CORESET. For example, after receiving an SSB associated with the CORESET (for example, a previously transmitted copy of the SSB), the UE 120 may shift the frequency range of the initial downlink bandwidth to include the frequency domain resource allocation of the CORESET. As shown in FIG. 7B, the UE 120 may not modify a size of the initial downlink bandwidth, but may change a range of frequencies that are included in the initial downlink bandwidth such that the frequency domain resource allocation of the CORESET is included within the initial downlink bandwidth. As a result, the UE 120 may receive the CORESET with the same quantity of PDCCH candidates as originally configured (for example, thereby maintaining a PDCCH capacity of the CORESET) and may maintain an aggregation level of each PDCCH candidate (for example, thereby improving a performance of the UE 120).

Figure 8:
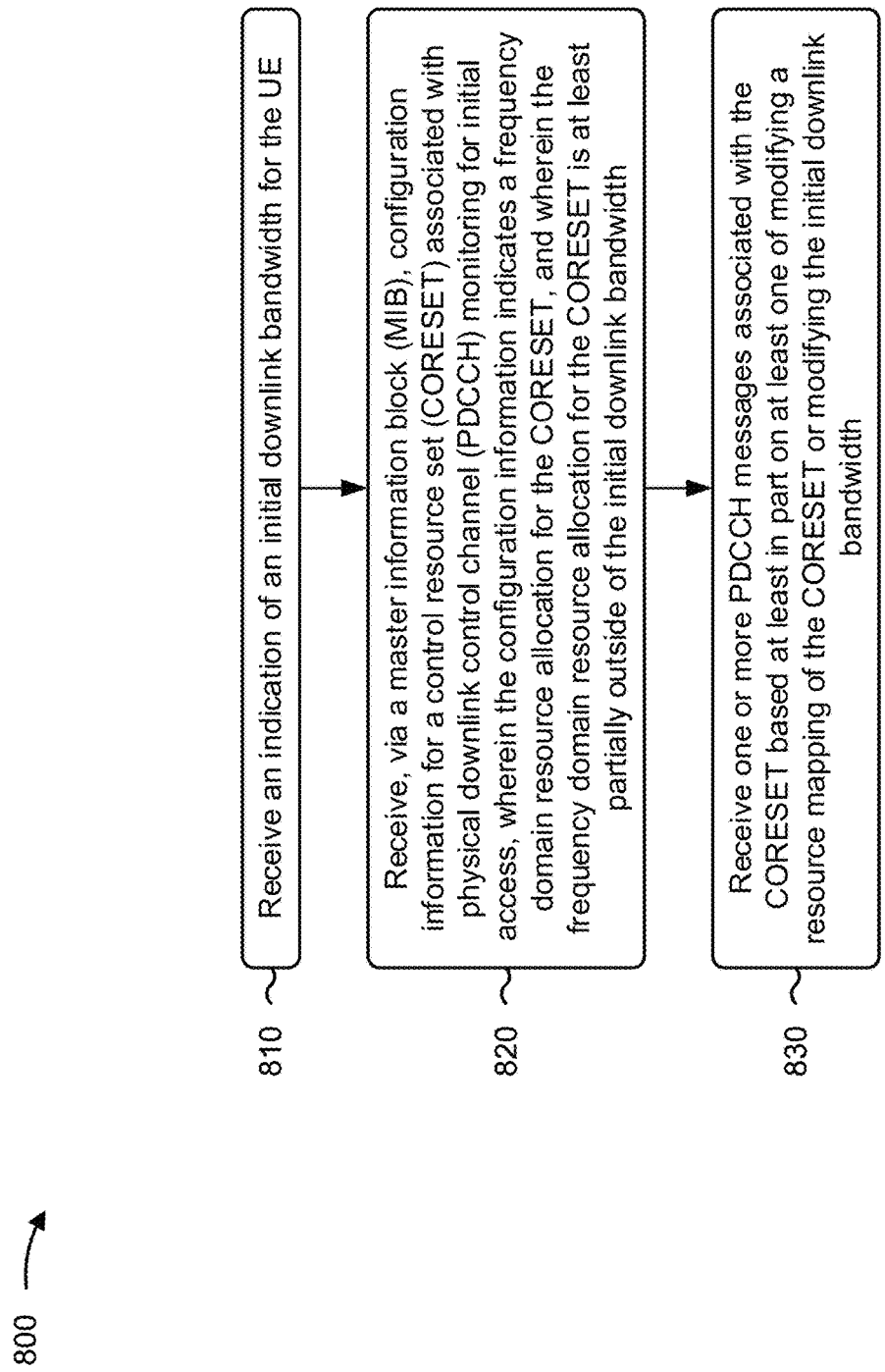
FIG. 8 is a flowchart illustrating an example process performed, for example, by a UE associated with partial CORESET handling, in accordance with the present disclosure.

FIG. 8 is a flowchart illustrating an example process 800 performed, for example, by a UE associated with partial CORESET handling in accordance with the present disclosure. Example process 800 is an example where the UE (for example, UE 120) performs operations associated with partial CORESET handling.

As shown in FIG. 8, in some aspects, process 800 may include receiving an indication of an initial downlink bandwidth for the UE (block 810). For example, the UE (such as by using communication manager 140 or reception component 1002, depicted in FIG. 10) may receive an indication of an initial downlink bandwidth for the UE, as described above.

As further shown in FIG. 8, in some aspects, process 800 may include receiving, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth (block 820). For example, the UE (such as by using communication manager 140 or reception component 1002, depicted in FIG. 10) may receive, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth, as described above.

As further shown in FIG. 8, in some aspects, process 800 may include receiving one or more PDCCH messages associated with the CORESET based at least in part on at least one of modifying a resource mapping of the CORESET or modifying the initial downlink bandwidth (block 830). For example, the UE (such as by using communication manager 140 or reception component 1002, depicted in FIG. 10) may receive one or more PDCCH messages associated with the CORESET based at least in part on at least one of modifying a resource mapping of the CORESET or modifying the initial downlink bandwidth, as described above.

Process 800 may include additional aspects, such as any single aspect or any combination of aspects described below or in connection with one or more other processes described elsewhere herein.

In a first additional aspect, receiving the one or more PDCCH messages associated with the CORESET includes modifying the resource mapping of the CORESET, and modifying the resource mapping includes performing CCE-to-REG mapping using a quantity of available resource blocks, or a quantity of available CCEs, in the initial downlink bandwidth; and receiving the one or more PDCCH messages based at least in part on monitoring the CORESET based at least in part on modifying the resource mapping.

In a second additional aspect, alone or in combination with the first aspect, receiving the one or more PDCCH messages associated with the CORESET includes modifying the resource mapping of the CORESET, and modifying the resource mapping includes modifying a CCE-to-REG mapping type to a non-interleaving mapping type; and receiving the one or more PDCCH messages based at least in part on monitoring the CORESET based at least in part on modifying the resource mapping.

In a third additional aspect, alone or in combination with one or more of the first and second aspects, process 800 includes receiving an SSB associated with the PDCCH monitoring for initial access, and receiving the one or more PDCCH messages associated with the CORESET includes modifying a frequency range associated with the initial downlink bandwidth to include the frequency domain resource allocation for the CORESET based at least in part on receiving the SSB; and receiving the one or more PDCCH messages based at least in part on monitoring the CORESET based at least in part on modifying the frequency range associated with the initial downlink bandwidth.

In a fourth additional aspect, alone or in combination with one or more of the first through third aspects, receiving the one or more PDCCH messages associated with the CORESET is based at least in part on one or more preconfigured rules.

In a fifth additional aspect, alone or in combination with one or more of the first through fourth aspects, receiving the one or more PDCCH messages associated with the CORESET includes receiving an indication of an action to be performed by the UE when the frequency domain resource allocation for the CORESET is at least partially outside of the initial downlink bandwidth, where the action includes at least one of modifying the resource mapping of the CORESET or modifying the initial downlink bandwidth, and receiving the one or more PDCCH messages based at least in part on performing the action.

In a sixth additional aspect, alone or in combination with one or more of the first through fifth aspects, receiving the indication of the action includes at least one of receiving the indication of the action via a CORESET zero configuration included in a PDCCH configuration indicated by the MIB, receiving the indication of the action via the MIB, receiving the indication of the action via a system information block, or receiving the indication of the action via dedicated signaling.

In a seventh additional aspect, alone or in combination with one or more of the first through sixth aspects, process 800 includes receiving an indication of a precoder granularity associated with the CORESET, or identifying the precoder granularity associated with the CORESET based at least in part on an action to be performed by the UE when the frequency domain resource allocation for the CORESET is at least partially outside of the initial downlink bandwidth.

In an eighth additional aspect, alone or in combination with one or more of the first through seventh aspects, the precoder granularity associated with the CORESET is all contiguous resource blocks associated with the CORESET, and receiving the one or more PDCCH messages includes receiving a DMRS using available resource blocks, or a quantity of available CCEs, in the initial downlink bandwidth.

In a ninth additional aspect, alone or in combination with one or more of the first through eighth aspects, receiving the one or more PDCCH messages includes reducing a quantity of resource blocks associated with the frequency domain resource allocation for the CORESET based at least in part on a quantity of available resource blocks in the initial downlink bandwidth, and receiving the one or more PDCCH messages based at least in part on monitoring the CORESET from a starting resource block of the CORESET, where the starting resource block is based at least in part on reducing the quantity of resource blocks associated with the frequency domain resource allocation for the CORESET.

In a tenth additional aspect, alone or in combination with one or more of the first through ninth aspects, receiving the one or more PDCCH messages includes receiving the one or more PDCCH messages based at least in part on monitoring the CORESET from a starting resource block of the CORESET, where the starting resource block is based at least in part on common resource block index values and a resource block offset indicated by the configuration information.

In an eleventh additional aspect, alone or in combination with one or more of the first through tenth aspects, receiving the one or more PDCCH messages includes receiving the one or more PDCCH messages based at least in part on monitoring the CORESET from a starting resource block of the CORESET, where the starting resource block is based at least in part on virtually extending resource block indices associated with the initial downlink bandwidth.

In a twelfth additional aspect, alone or in combination with one or more of the first through eleventh aspects, receiving the one or more PDCCH messages associated with the CORESET is based at least in part on identifying a starting resource block of the CORESET, that is outside of the initial downlink bandwidth, using one or more preconfigured rules.

In a thirteenth additional aspect, alone or in combination with one or more of the first through twelfth aspects, process 800 includes receiving an indication of an action to be performed by the UE to identify a starting resource block of the CORESET that is outside of the initial downlink bandwidth.

In a fourteenth additional aspect, alone or in combination with one or more of the first through thirteenth aspects, receiving the indication of the action to be performed by the UE to identify the starting resource block of the CORESET includes receiving the indication of the action via a CORESET zero configuration included in a PDCCH configuration indicated by the MIB, receiving the indication of the action via the MIB, receiving the indication of the action via a system information block, or receiving the indication of the action via dedicated signaling.

In a fifteenth additional aspect, alone or in combination with one or more of the first through fourteenth aspects, the CORESET is a CORESET zero (CORESET 0).

In a sixteenth additional aspect, alone or in combination with one or more of the first through fifteenth aspects, the initial downlink bandwidth is an initial downlink BWP or a maximum downlink bandwidth for the UE.

In a seventeenth additional aspect, alone or in combination with one or more of the first through sixteenth aspects, the UE is a reduced capability UE.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

Figure 9:
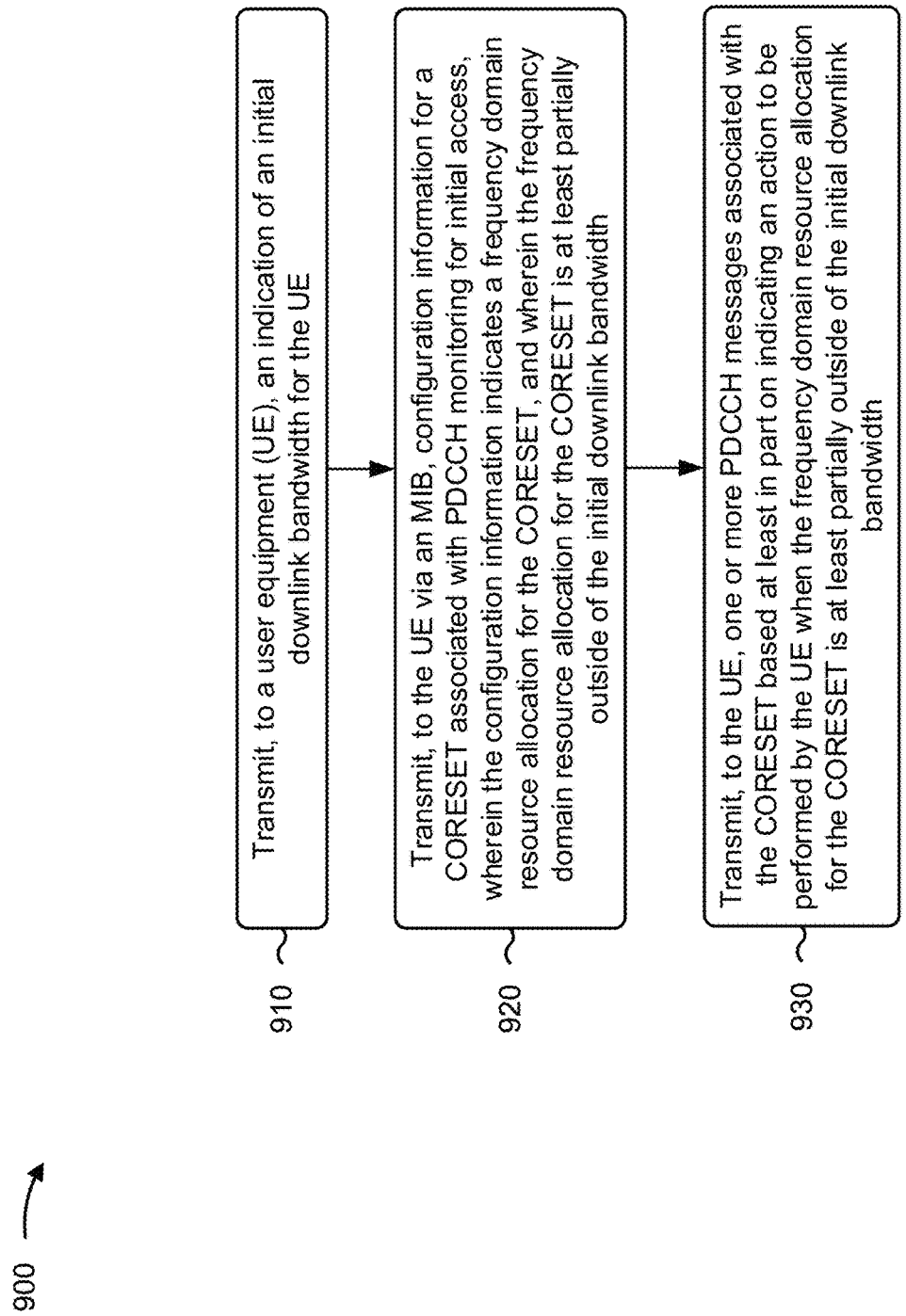
FIG. 9 is a flowchart illustrating an example process performed, for example, by a base station associated with partial CORESET handling in accordance with the present disclosure.

FIG. 9 is a flowchart illustrating an example process 900 performed, for example, by a base station associated with partial CORESET handling in accordance with the present disclosure. Example process 900 is an example where the base station (for example, base station 110) performs operations associated with partial CORESET handling.

As shown in FIG. 9, in some aspects, process 900 may include transmitting, to a UE, an indication of an initial downlink bandwidth for the UE (block 910). For example, the base station (such as by using communication manager 150 or transmission component 1104, depicted in FIG. 11) may transmit, to a UE, an indication of an initial downlink bandwidth for the UE, as described above.

As further shown in FIG. 9, in some aspects, process 900 may include transmitting, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth (block 920). For example, the base station (such as by using communication manager 150 or transmission component 1104, depicted in FIG. 11) may transmit, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth, as described above.

As further shown in FIG. 9, in some aspects, process 900 may include transmitting, to the UE, one or more PDCCH messages associated with the CORESET based at least in part on indicating an action to be performed by the UE when the frequency domain resource allocation for the CORESET is at least partially outside of the initial downlink bandwidth (block 930). For example, the base station (such as by using communication manager 150 or transmission component 1104, depicted in FIG. 11) may transmit, to the UE, one or more PDCCH messages associated with the CORESET based at least in part on indicating an action to be performed by the UE when the frequency domain resource allocation for the CORESET is at least partially outside of the initial downlink bandwidth, as described above.

Process 900 may include additional aspects, such as any single aspect or any combination of aspects described below or in connection with one or more other processes described elsewhere herein.

In a first additional aspect, the action to be performed by the UE is based at least in part on one or more preconfigured rules.

In a second additional aspect, alone or in combination with the first aspect, transmitting the one or more PDCCH messages associated with the CORESET includes transmitting, to the UE, an indication of the action to be performed by the UE when the frequency domain resource allocation for the CORESET is at least partially outside of the initial downlink bandwidth, where the action includes at least one of modifying the resource mapping of the CORESET or modifying the initial downlink bandwidth.

In a third additional aspect, alone or in combination with one or more of the first and second aspects, transmitting the indication of the action includes at least one of transmitting the indication of the action via a CORESET zero configuration included in a PDCCH configuration indicated by the MIB, transmitting the indication of the action via the MIB, transmitting the indication of the action via a system information block, or transmitting the indication of the action via dedicated signaling.

In a fourth additional aspect, alone or in combination with one or more of the first through third aspects, process 900 includes transmitting an indication of a precoder granularity associated with the CORESET.

In a fifth additional aspect, alone or in combination with one or more of the first through fourth aspects, the action to be performed by the UE is associated with identifying a starting resource block of the CORESET, that is outside of the initial downlink bandwidth, using one or more preconfigured rules.

In a sixth additional aspect, alone or in combination with one or more of the first through fifth aspects, process 900 includes transmitting an indication of the action to be performed by the UE, where the action is associated with identifying a starting resource block of the CORESET that is outside of the initial downlink bandwidth.

In a seventh additional aspect, alone or in combination with one or more of the first through sixth aspects, transmitting the indication of the action to be performed by the UE associated with identifying the starting resource block of the CORESET includes transmitting the indication of the action via a CORESET zero configuration included in a PDCCH configuration indicated by the MIB, transmitting the indication of the action via the MIB, transmitting the indication of the action via a system information block, or transmitting the indication of the action via dedicated signaling.

In an eighth additional aspect, alone or in combination with one or more of the first through seventh aspects, the action to be performed by the UE associated with identifying the starting resource block of the CORESET includes at least one of reducing a quantity of resource blocks associated with the frequency domain resource allocation for the CORESET based at least in part on a quantity of available resource blocks in the initial downlink bandwidth, identifying the starting resource block of the CORESET using common resource block index values and a resource block offset indicated by the configuration information, or identifying the starting resource block of the CORESET based at least in part on virtually extending resource block indices associated with the initial downlink bandwidth.

In a ninth additional aspect, alone or in combination with one or more of the first through eighth aspects, the CORESET is a CORESET zero (CORESET 0).

In a tenth additional aspect, alone or in combination with one or more of the first through ninth aspects, the initial downlink bandwidth is an initial downlink bandwidth part (BWP) or a maximum downlink bandwidth for the UE.

In an eleventh additional aspect, alone or in combination with one or more of the first through tenth aspects, the UE is a reduced capability UE.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
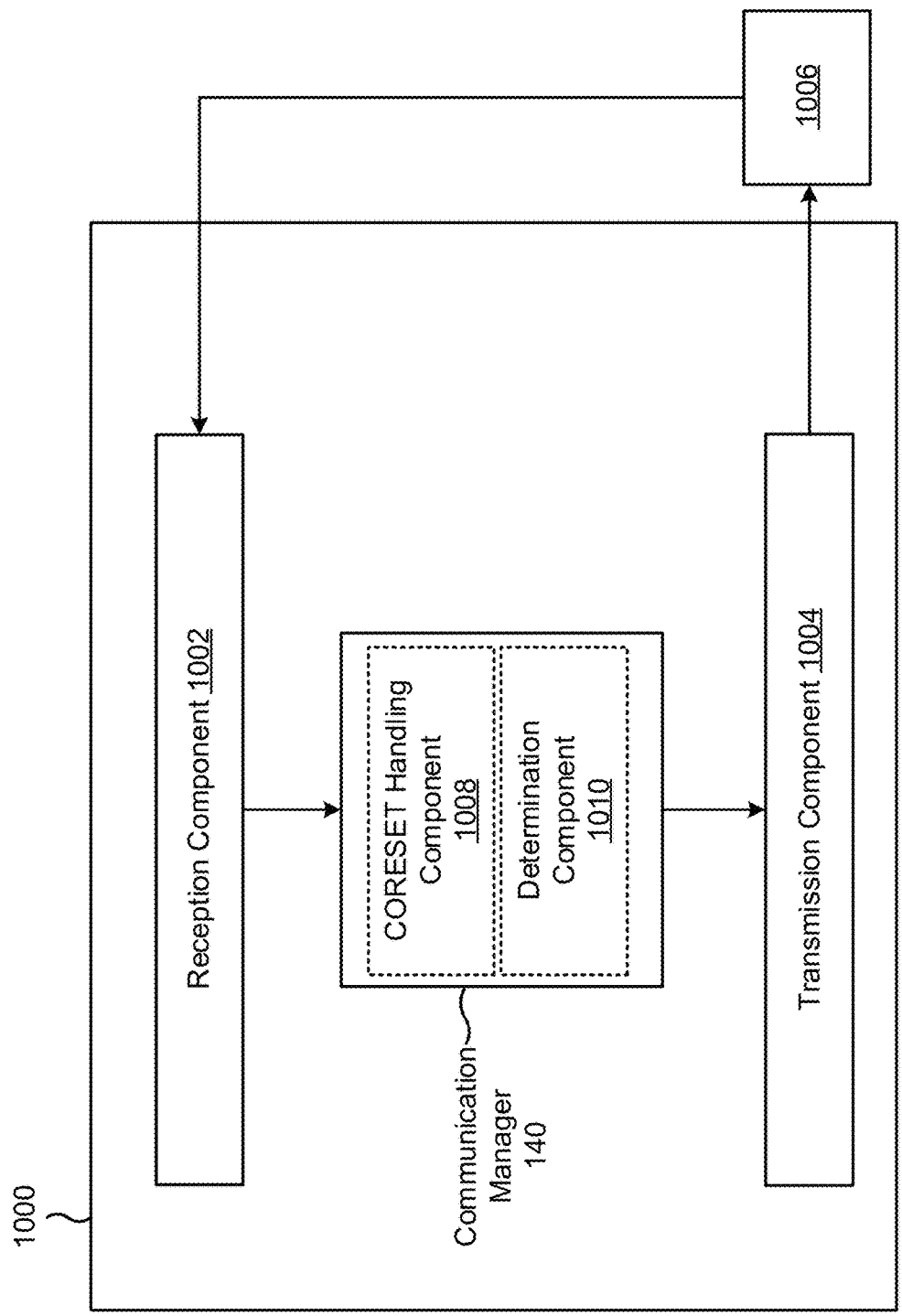
FIGS. 10 and 11 are diagrams of example apparatuses for wireless communication in accordance with the present disclosure.

FIG. 10 is a diagram of an example apparatus 1000 for wireless communication in accordance with the present disclosure. The apparatus 1000 may be a UE, or a UE may include the apparatus 1000. In some aspects, the apparatus 1000 includes a reception component 1002, a transmission component 1004, and a communication manager 140, which may be in communication with one another (for example, via one or more buses). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 7A and 7B. Additionally or alternatively, the apparatus 1000 may be configured to perform one or more processes described herein, such as process 800 of FIG. 8, or a combination thereof. In some aspects, the apparatus 1000 may include one or more components of the UE described above in connection with FIG. 2.

The reception component 1002 may receive communications, such as reference signals, control information, data communications, or a combination thereof, from the apparatus 1006. The reception component 1002 may provide received communications to one or more other components of the apparatus 1000, such as the communication manager 140. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, the communication manager 140 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The communication manager 140 may receive or may cause the reception component 1002 to receive an indication of an initial downlink bandwidth for the UE. The communication manager 140 may receive or may cause the reception component 1002 to receive, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The communication manager 140 may receive or may cause the reception component 1002 to receive one or more PDCCH messages associated with the CORESET based at least in part on at least one of modifying a resource mapping of the CORESET or modifying the initial downlink bandwidth. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a CORESET handling component 1008, a determination component 1010, or a combination thereof. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive an indication of an initial downlink bandwidth for the UE. The reception component 1002 may receive, via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The reception component 1002 may receive one or more PDCCH messages associated with the CORESET based at least in part on at least one of modifying a resource mapping of the CORESET or modifying the initial downlink bandwidth.

The CORESET handling component 1008 may modifying a resource mapping of the CORESET. The CORESET handling component 1008 may perform CCE-to-REG mapping using a quantity of available resource blocks, or a quantity of available CCEs, in the initial downlink bandwidth. The CORESET handling component 1008 may modify a CCE-to-REG mapping type to a non-interleaving mapping type.

The reception component 1002 may receive an SSB associated with the PDCCH monitoring for initial access. The CORESET handling component 1008 may modify a frequency range associated with the initial downlink bandwidth to include the frequency domain resource allocation for the CORESET based at least in part on receiving the SSB.

The reception component 1002 may receive an indication of an action to be performed by the UE when the frequency domain resource allocation for the CORESET is at least partially outside of the initial downlink bandwidth.

The reception component 1002 may receive an indication of a precoder granularity associated with the CORESET.

The determination component 1010 may identify the precoder granularity associated with the CORESET based at least in part on an action to be performed by the UE when the frequency domain resource allocation for the CORESET is at least partially outside of the initial downlink bandwidth.

The reception component 1002 may receive an indication of an action to be performed by the UE to identify a starting resource block of the CORESET that is outside of the initial downlink bandwidth.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
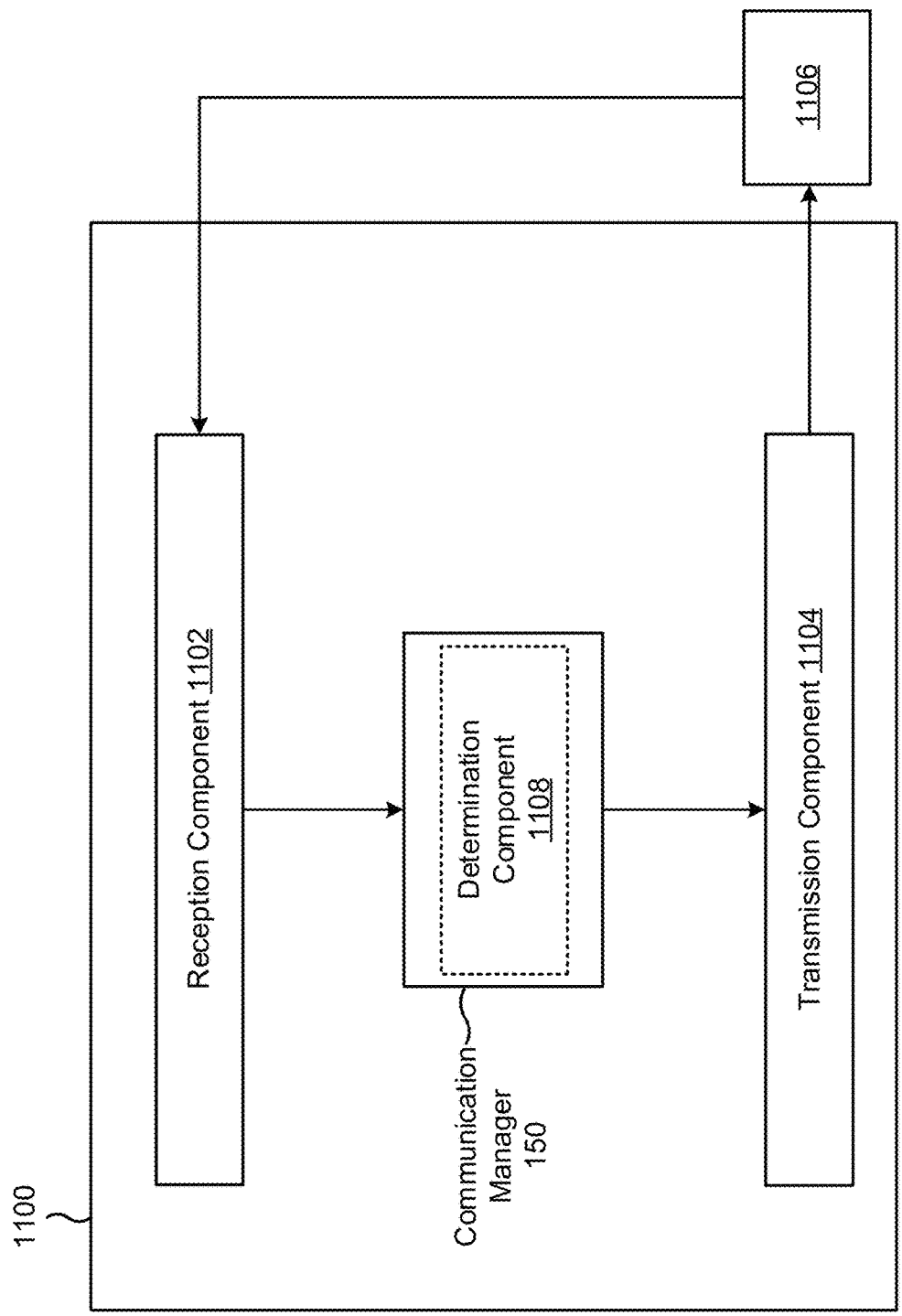

FIG. 11 is a diagram of an example apparatus 1100 for wireless communication in accordance with the present disclosure. The apparatus 1100 may be a base station, or a base station may include the apparatus 1100. In some aspects, the apparatus 1100 includes a reception component 1102, a transmission component 1104, and a communication manager 150, which may be in communication with one another (for example, via one or more buses). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIGS. 7A and 7B. Additionally or alternatively, the apparatus 1100 may be configured to perform one or more processes described herein, such as process 900 of FIG. 9, or a combination thereof. In some aspects, the apparatus 1100 may include one or more components of the base station described above in connection with FIG. 2.

The reception component 1102 may receive communications, such as reference signals, control information, data communications, or a combination thereof, from the apparatus 1106. The reception component 1102 may provide received communications to one or more other components of the apparatus 1100, such as the communication manager 150. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, the communication manager 150 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The communication manager 150 may transmit or may cause the transmission component 1104 to transmit, to a UE, an indication of an initial downlink bandwidth for the UE. The communication manager 150 may transmit or may cause the transmission component 1104 to transmit, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The communication manager 150 may transmit or may cause the transmission component 1104 to transmit, to the UE, one or more PDCCH messages associated with the CORESET based at least in part on indicating an action to be performed by the UE when the frequency domain resource allocation for the CORESET is at least partially outside of the initial downlink bandwidth. In some aspects, the communication manager 150 may perform one or more operations described elsewhere herein as being performed by one or more components of the communication manager 150.

The communication manager 150 may include a controller/processor, a memory, a scheduler, a communication unit, or a combination thereof, of the base station described above in connection with FIG. 2. In some aspects, the communication manager 150 includes a set of components, such as a determination component 1108, among other examples. Alternatively, the set of components may be separate and distinct from the communication manager 150. In some aspects, one or more components of the set of components may include or may be implemented within a controller/processor, a memory, a scheduler, a communication unit, or a combination thereof, of the base station described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1104 may transmit, to a UE, an indication of an initial downlink bandwidth for the UE. The transmission component 1104 may transmit, to the UE via an MIB, configuration information for a CORESET associated with PDCCH monitoring for initial access, wherein the configuration information indicates a frequency domain resource allocation for the CORESET, and wherein the frequency domain resource allocation for the CORESET is at least partially outside of the initial downlink bandwidth. The transmission component 1104 may transmit, to the UE, one or more PDCCH messages associated with the CORESET based at least in part on indicating an action to be performed by the UE when the frequency domain resource allocation for the CORESET is at least partially outside of the initial downlink bandwidth.

The determination component 1108 may determine one or more actions to be performed by the UE when the frequency domain resource allocation for the CORESET is at least partially outside of the initial downlink bandwidth. The determination component 1108 may determine an action to be performed by the UE associated with identifying a starting resource block of the CORESET that is outside of the initial downlink bandwidth.

The transmission component 1104 may transmit to the UE, an indication of the action to be performed by the UE when the frequency domain resource allocation for the CORESET is at least partially outside of the initial downlink bandwidth, wherein the action includes at least one of modifying the resource mapping of the CORESET or modifying the initial downlink bandwidth.

The transmission component 1104 may transmit the indication of the action via a CORESET zero configuration included in a PDCCH configuration indicated by the MIB. The transmission component 1104 may transmit the indication of the action via the MIB. The transmission component 1104 may transmit the indication of the action via a system information block. The transmission component 1104 may transmit the indication of the action via dedicated signaling.

The transmission component 1104 may transmit an indication of a precoder granularity associated with the CORESET.

The transmission component 1104 may transmit an indication of the action to be performed by the UE, where the action is associated with identifying a starting resource block of the CORESET that is outside of the initial downlink bandwidth. The transmission component 1104 may transmit the indication of the action via a CORESET zero configuration included in a PDCCH configuration indicated by the MIB. The transmission component 1104 may transmit the indication of the action via the MIB. The transmission component 1104 may transmit the indication of the action via a system information block. The transmission component 1104 may transmit the indication of the action via dedicated signaling.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving an indication of an initial downlink bandwidth for the UE; receiving, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth; and receiving one or more PDCCH messages associated with the CORESET based at least in part on at least one of modifying a resource mapping of the CORESET or modifying the initial downlink bandwidth.

Aspect 2: The method of Aspect 1, wherein receiving the one or more PDCCH messages associated with the CORESET comprises: modifying the resource mapping of the CORESET, wherein modifying the resource mapping includes performing control channel element (CCE) to resource element group (REG) mapping using a quantity of available resource blocks, or a quantity of available CCEs, in the initial downlink bandwidth; and receiving the one or more PDCCH messages based at least in part on monitoring the CORESET based at least in part on modifying the resource mapping.

Aspect 3: The method of any of Aspects 1-2, wherein receiving the one or more PDCCH messages associated with the CORESET comprises: modifying the resource mapping of the CORESET, wherein modifying the resource mapping includes modifying a control channel element (CCE) to resource element group (REG) mapping type to a non-interleaving mapping type; and receiving the one or more PDCCH messages based at least in part on monitoring the CORESET based at least in part on modifying the resource mapping.

Aspect 4: The method of any of Aspects 1-3, further comprising: receiving a synchronization signal block (SSB) associated with the PDCCH monitoring for initial access; wherein receiving the one or more PDCCH messages associated with the CORESET comprises: modifying a frequency range associated with the initial downlink bandwidth to include the frequency domain resource allocation for the CORESET based at least in part on receiving the SSB; and receiving the one or more PDCCH messages based at least in part on monitoring the CORESET based at least in part on modifying the frequency range associated with the initial downlink bandwidth.

Aspect 5: The method of any of Aspects 1-4, wherein receiving the one or more PDCCH messages associated with the CORESET is based at least in part on one or more preconfigured rules.

Aspect 6: The method of any of Aspects 1-5, wherein receiving the one or more PDCCH messages associated with the CORESET comprises: receiving an indication of an action to be performed by the UE when the frequency domain resource allocation for the CORESET is at least partially outside of the initial downlink bandwidth, wherein the action includes at least one of modifying the resource mapping of the CORESET or modifying the initial downlink bandwidth; and receiving the one or more PDCCH messages based at least in part on performing the action.

Aspect 7: The method of Aspect 6, wherein receiving the indication of the action comprises at least one of: receiving the indication of the action via a CORESET zero configuration included in a PDCCH configuration indicated by the MIB; receiving the indication of the action via the MIB; receiving the indication of the action via a system information block; or receiving the indication of the action via dedicated signaling.

Aspect 8: The method of any of Aspects 1-7, further comprising: receiving an indication of a precoder granularity associated with the CORESET; or identifying the precoder granularity associated with the CORESET based at least in part on an action to be performed by the UE when the frequency domain resource allocation for the CORESET is at least partially outside of the initial downlink bandwidth.

Aspect 9: The method of Aspect 8, wherein the precoder granularity associated with the CORESET is all contiguous resource blocks associated with the CORESET, and wherein receiving the one or more PDCCH messages comprises: receiving a demodulation reference signal (DMRS) using available resource blocks, or a quantity of available CCEs, in the initial downlink bandwidth.

Aspect 10: The method of any of Aspects 1-9, wherein receiving the one or more PDCCH messages comprises: reducing a quantity of resource blocks associated with the frequency domain resource allocation for the CORESET based at least in part on a quantity of available resource blocks in the initial downlink bandwidth; and receiving the one or more PDCCH messages based at least in part on monitoring the CORESET from a starting resource block of the CORESET, wherein the starting resource block is based at least in part on reducing the quantity of resource blocks associated with the frequency domain resource allocation for the CORESET.

Aspect 11: The method of any of Aspects 1-10, wherein receiving the one or more PDCCH messages comprises: receiving the one or more PDCCH messages based at least in part on monitoring the CORESET from a starting resource block of the CORESET, wherein the starting resource block is based at least in part on common resource block index values and a resource block offset indicated by the configuration information.

Aspect 12: The method of any of Aspects 1-11, wherein receiving the one or more PDCCH messages comprises: receiving the one or more PDCCH messages based at least in part on monitoring the CORESET from a starting resource block of the CORESET, wherein the starting resource block is based at least in part on virtually extending resource block indices associated with the initial downlink bandwidth.

Aspect 13: The method of any of Aspects 1-12, wherein receiving the one or more PDCCH messages associated with the CORESET is based at least in part on identifying a starting resource block of the CORESET, that is outside of the initial downlink bandwidth, using one or more preconfigured rules.

Aspect 14: The method of any of Aspects 1-13, further comprising: receiving an indication of an action to be performed by the UE to identify a starting resource block of the CORESET that is outside of the initial downlink bandwidth.

Aspect 15: The method of Aspect 14, wherein receiving the indication of the action to be performed by the UE to identify the starting resource block of the CORESET comprises: receiving the indication of the action via a CORESET zero configuration included in a PDCCH configuration indicated by the MIB; receiving the indication of the action via the MIB; receiving the indication of the action via a system information block; or receiving the indication of the action via dedicated signaling.

Aspect 16: The method of any of Aspects 1-15, wherein the CORESET is a CORESET zero (CORESET 0).

Aspect 17: The method of any of Aspects 1-16, wherein the initial downlink bandwidth is an initial downlink bandwidth part (BWP) or a maximum downlink bandwidth for the UE.

Aspect 18: The method of any of Aspects 1-17, wherein the UE is a reduced capability UE.

Aspect 19: A method of wireless communication performed by a base station, comprising: transmitting, to a user equipment (UE), an indication of an initial downlink bandwidth for the UE; transmitting, to the UE via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth; and transmitting, to the UE, one or more PDCCH messages associated with the CORESET based at least in part on indicating an action to be performed by the UE when the frequency domain resource allocation for the CORESET is at least partially outside of the initial downlink bandwidth.

Aspect 20: The method of Aspect 19, wherein the action to be performed by the UE is based at least in part on one or more preconfigured rules.

Aspect 21: The method of any of Aspects 19-20, wherein transmitting the one or more PDCCH messages associated with the CORESET comprises: transmitting, to the UE, an indication of the action to be performed by the UE when the frequency domain resource allocation for the CORESET is at least partially outside of the initial downlink bandwidth, wherein the action includes at least one of modifying the resource mapping of the CORESET or modifying the initial downlink bandwidth.

Aspect 22: The method of Aspect 21, wherein transmitting the indication of the action comprises at least one of: transmitting the indication of the action via a CORESET zero configuration included in a PDCCH configuration indicated by the MIB; transmitting the indication of the action via the MIB; transmitting the indication of the action via a system information block; or transmitting the indication of the action via dedicated signaling.

Aspect 23: The method of any of Aspects 19-22, further comprising: transmitting an indication of a precoder granularity associated with the CORESET.

Aspect 24: The method of any of Aspects 19-23, wherein the action to be performed by the UE is associated with identifying a starting resource block of the CORESET, that is outside of the initial downlink bandwidth, using one or more preconfigured rules.

Aspect 25: The method of any of Aspects 19-24, further comprising: transmitting an indication of the action to be performed by the UE, wherein the action is associated with identifying a starting resource block of the CORESET that is outside of the initial downlink bandwidth.

Aspect 26: The method of Aspect 25, wherein transmitting the indication of the action to be performed by the UE associated with identifying the starting resource block of the CORESET comprises: transmitting the indication of the action via a CORESET zero configuration included in a PDCCH configuration indicated by the MIB; transmitting the indication of the action via the MIB; transmitting the indication of the action via a system information block; or transmitting the indication of the action via dedicated signaling.

Aspect 27: The method of any of Aspects 25-26, wherein the action to be performed by the UE associated with identifying the starting resource block of the CORESET includes at least one of: reducing a quantity of resource blocks associated with the frequency domain resource allocation for the CORESET based at least in part on a quantity of available resource blocks in the initial downlink bandwidth; identifying the starting resource block of the CORESET using common resource block index values and a resource block offset indicated by the configuration information; or identifying the starting resource block of the CORESET based at least in part on virtually extending resource block indices associated with the initial downlink bandwidth.

Aspect 28: The method of any of Aspects 19-27, wherein the CORESET is a CORESET zero (CORESET 0).

Aspect 29: The method of any of Aspects 19-28, wherein the initial downlink bandwidth is an initial downlink bandwidth part (BWP) or a maximum downlink bandwidth for the UE.

Aspect 30: The method of any of Aspects 19-29, wherein the UE is a reduced capability UE.

Aspect 31: An apparatus for wireless communication at a device, comprising a processor; memory coupled with the processor; and instructions stored in the memory and executable by the processor to cause the apparatus to perform the method of one or more of Aspects 1-18.

Aspect 32: A device for wireless communication, comprising a memory and one or more processors coupled to the memory, the one or more processors configured to perform the method of one or more of Aspects 1-18.

Aspect 33: An apparatus for wireless communication, comprising at least one means for performing the method of one or more of Aspects 1-18.

Aspect 34: A non-transitory computer-readable medium storing code for wireless communication, the code comprising instructions executable by a processor to perform the method of one or more of Aspects 1-18.

Aspect 35: A non-transitory computer-readable medium storing a set of instructions for wireless communication, the set of instructions comprising one or more instructions that, when executed by one or more processors of a device, cause the device to perform the method of one or more of Aspects 1-18.

Aspect 36: An apparatus for wireless communication at a device, comprising a processor; memory coupled with the processor; and instructions stored in the memory and executable by the processor to cause the apparatus to perform the method of one or more of Aspects 19-30.

Aspect 37: A device for wireless communication, comprising a memory and one or more processors coupled to the memory, the one or more processors configured to perform the method of one or more of Aspects 19-30.

Aspect 38: An apparatus for wireless communication, comprising at least one means for performing the method of one or more of Aspects 19-30.

Aspect 39: A non-transitory computer-readable medium storing code for wireless communication, the code comprising instructions executable by a processor to perform the method of one or more of Aspects 19-30.

Aspect 40: A non-transitory computer-readable medium storing a set of instructions for wireless communication, the set of instructions comprising one or more instructions that, when executed by one or more processors of a device, cause the device to perform the method of one or more of Aspects 19-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
at least one processor coupled with at least one memory and configured to cause the UE to:
receive an indication of an initial downlink bandwidth for the UE;
receive, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth; and
receive one or more PDCCH messages associated with the CORESET based at least in part on modifying a resource mapping of the CORESET, the modification of the resource mapping of the CORESET including:
performing control channel element (CCE) to resource element group (REG) mapping using a quantity of available resource blocks, or a quantity of available CCEs, in the initial downlink bandwidth;
modifying a control channel element (CCE) to resource element group (REG) mapping type to a non-interleaving mapping type; or
modifying a frequency range associated with the initial downlink bandwidth to include the frequency domain resource allocation for the CORESET in accordance with receiving a synchronization signal block (SSB) associated with the PDCCH monitoring for initial access.

2. A user equipment (UE) for wireless communication, comprising:
at least one processor coupled with at least one memory and configured to cause the UE to:
receive an indication of an initial downlink bandwidth for the UE;
receive, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth;
receive an indication of an action to be performed by the UE when the frequency domain resource allocation for the CORESET is at least partially outside of the initial downlink bandwidth, wherein the action includes at least one of modifying a resource mapping of the CORESET or modifying the initial downlink bandwidth; and
receive one or more PDCCH messages associated with the CORESET based at least in part on performing the action.

3. The UE of claim 2, wherein the at least one memory further stores processor-readable code configured to cause the UE to:
receive an indication of a precoder granularity associated with the CORESET; or
identify the precoder granularity associated with the CORESET based at least in part on an action to be performed by the UE when the frequency domain resource allocation for the CORESET is at least partially outside of the initial downlink bandwidth.

4. A user equipment (UE) for wireless communication, comprising:
at least one processor coupled with at least one memory and configured to cause the UE to:
receive an indication of an initial downlink bandwidth for the UE;
receive, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth;
reduce a quantity of resource blocks associated with the frequency domain resource allocation for the CORESET based at least in part on a quantity of available resource blocks in the initial downlink bandwidth; and
receive one or more PDCCH messages based at least in part on monitoring the CORESET from a starting resource block of the CORESET, wherein the starting resource block is based at least in part on reducing the quantity of resource blocks associated with the frequency domain resource allocation for the CORESET.

5. A base station for wireless communication, comprising:
at least one processor coupled with at least one memory and configured to cause the base station to:
transmit, to a user equipment (UE), an indication of an initial downlink bandwidth for the UE;
transmit, to the UE via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth;
transmit, to the UE, an indication of the action to be performed by the UE when the frequency domain resource allocation for the CORESET is at least partially outside of the initial downlink bandwidth, wherein the action includes at least one of modifying the resource mapping of the CORESET or modifying the initial downlink bandwidth; and transmit, to the UE, one or more PDCCH messages associated with the CORESET based at least in part on indicating the action.

6. A base station for wireless communication, comprising:
at least one processor coupled with at least one memory and configured to cause the base station to:
transmit, to a user equipment (UE), an indication of an initial downlink bandwidth for the UE;
transmit, to the UE via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth; and
transmit an indication of an action to be performed by the UE when the frequency domain resource allocation for the CORESET is at least partially outside of the initial downlink bandwidth, wherein the action is associated with identifying a starting resource block of the CORESET that is outside of the initial downlink bandwidth and wherein the action includes at least one of:
reducing a quantity of resource blocks associated with the frequency domain resource allocation for the CORESET based at least in part on a quantity of available resource blocks in the initial downlink bandwidth;
identifying the starting resource block of the CORESET using common resource block index values and a resource block offset indicated by the configuration information; or
identifying the starting resource block of the CORESET based at least in part on virtually extending resource block indices associated with the initial downlink bandwidth.

7. A method of wireless communication performed by a user equipment (UE), comprising:
receiving an indication of an initial downlink bandwidth for the UE;
receiving, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth; and
receiving one or more PDCCH messages associated with the CORESET based at least in part on modifying a resource mapping of the CORESET, the modification of the resource mapping of the CORESET including:
performing control channel element (CCE) to resource element group (REG) mapping using a quantity of available resource blocks, or a quantity of available CCEs, in the initial downlink bandwidth;
modifying a control channel element (CCE) to resource element group (REG) mapping type to a non-interleaving mapping type; or
modifying a frequency range associated with the initial downlink bandwidth to include the frequency domain resource allocation for the CORESET in accordance with receiving a synchronization signal block (SSB) associated with the PDCCH monitoring for initial access.

8. A method of wireless communication performed by a user equipment (UE), comprising:
receiving an indication of an initial downlink bandwidth for the UE;
receiving, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth;
receiving an indication of an action to be performed by the UE when the frequency domain resource allocation for the CORESET is at least partially outside of the initial downlink bandwidth, wherein the action includes at least one of modifying a resource mapping of the CORESET or modifying the initial downlink bandwidth; and
receiving one or more PDCCH messages associated with the CORESET based at least in part on performing the action.

9. The method of claim 8, further comprising:
receiving an indication of a precoder granularity associated with the CORESET; or
identifying the precoder granularity associated with the CORESET based at least in part on an action to be performed by the UE when the frequency domain resource allocation for the CORESET is at least partially outside of the initial downlink bandwidth.

10. A method of wireless communication performed by a user equipment (UE), comprising:
receiving an indication of an initial downlink bandwidth for the UE;
receiving, via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth;
reducing a quantity of resource blocks associated with the frequency domain resource allocation for the CORESET based at least in part on a quantity of available resource blocks in the initial downlink bandwidth; and
receiving one or more PDCCH messages based at least in part on monitoring the CORESET from a starting resource block of the CORESET, wherein the starting resource block is based at least in part on reducing the quantity of resource blocks associated with the frequency domain resource allocation for the CORESET.

11. A method of wireless communication performed by a base station, comprising:
transmitting, to a user equipment (UE), an indication of an initial downlink bandwidth for the UE;
transmitting, to the UE via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth;

transmitting, to the UE, an indication of the action to be performed by the UE when the frequency domain resource allocation for the CORESET is at least partially outside of the initial downlink bandwidth, wherein the action includes at least one of modifying the resource mapping of the CORESET or modifying the initial downlink bandwidth; and transmitting, to the UE, one or more PDCCH messages associated with the CORESET based at least in part on indicating the action.

12. A method of wireless communication performed by a base station, comprising:

transmitting, to a user equipment (UE), an indication of an initial downlink bandwidth for the UE;

transmitting, to the UE via a master information block (MIB), configuration information for a control resource set (CORESET) associated with physical downlink control channel (PDCCH) monitoring for initial access, wherein the configuration information indicates a frequency domain resource allocation for the CORESET, and wherein the frequency domain resource allocation for the CORESET is at least partially outside of the initial downlink bandwidth; and transmitting an indication of an action to be performed by the UE when the frequency domain resource allocation for the CORESET is at least partially outside of the initial downlink bandwidth, wherein the action is associated with identifying a starting resource block of the CORESET that is outside of the initial downlink bandwidth and wherein the action includes at least one of:

reducing a quantity of resource blocks associated with the frequency domain resource allocation for the CORESET based at least in part on a quantity of available resource blocks in the initial downlink bandwidth;

identifying the starting resource block of the CORESET using common resource block index values and a resource block offset indicated by the configuration information; or identifying the starting resource block of the CORESET based at least in part on virtually extending resource block indices associated with the initial downlink bandwidth.

\* \* \* \* \*